(12) United States Patent
Thibodeau et al.

(10) Patent No.: US 12,408,712 B1
(45) Date of Patent: Sep. 9, 2025

(54) FLUID MANAGEMENT SYSTEM, APPARATUS FOR MAKING FLUID MANAGEMENT SYSTEM AND METHOD OF MANUFACTURING FLUID MANAGEMENT SYSTEM

(71) Applicant: MAINE-LEE TECHNOLOGY GROUP LLC, Portland, ME (US)

(72) Inventors: Lee L. Thibodeau, Cumberland Foreside, ME (US); William R. Kimball, Stratham, NH (US); Kenneth A. Pelley, Hopewell, NJ (US); John F. Poccia, III, Monmouth Beach, NJ (US)

(73) Assignee: MAINE-LEE TECHNOLOGY GROUP LLC, Portland, ME (US)

( * ) Notice: Subject to any disclaimer, the term of this patent is extended or adjusted under 35 U.S.C. 154(b) by 0 days.

(21) Appl. No.: 18/979,269

(22) Filed: Dec. 12, 2024

Related U.S. Application Data

(62) Division of application No. 18/762,518, filed on Jul. 2, 2024.

(51) Int. Cl.
| | | |
|---|---|---|
| *A41D 13/12* | (2006.01) | |
| *A41D 27/24* | (2006.01) | |
| *B29C 65/00* | (2006.01) | |
| *B29C 65/02* | (2006.01) | |

(52) U.S. Cl.
CPC ....... *A41D 13/1227* (2013.01); *A41D 27/245* (2013.01); *B29C 65/02* (2013.01); *B29C 66/00* (2013.01); *B29C 66/80* (2013.01)

(58) Field of Classification Search
USPC ... 156/60, 229, 293, 294, 296, 308.2, 308.4, 156/309.6; 2/455, 456, 457, 16, 59, 69, 2/85, 87, 115, 123, 125, 159, 160, 161.6, 2/161.7; 428/34.1, 35.7, 36.1, 36.2, 36.8
See application file for complete search history.

(56) References Cited

U.S. PATENT DOCUMENTS

| | | | | |
|---|---|---|---|---|
| 1,085,791 | A * | 2/1914 | Name ...................... | A41D 1/02 2/93 |
| 2,244,368 | A * | 6/1941 | Kleiman ................ | A41D 27/10 2/270 |
| 2,259,560 | A * | 10/1941 | Glidden ................ | A41D 27/28 2/87 |
| 2,994,089 | A * | 8/1961 | Ferguson, Jr. ............ | G21F 3/02 2/81 |

(Continued)

*Primary Examiner* — Philip C Tucker
*Assistant Examiner* — Brian R Slawski
(74) *Attorney, Agent, or Firm* — Duane Morris LLP

(57) ABSTRACT

An improved protective garment, and systems and methods of manufacturing are disclosed, wherein a method of manufacturing the protective garment, includes: providing a cuff material; providing a sleeve of a protective garment; and bonding the cuff material to the sleeve at a predetermined first bonding zone of the sleeve, wherein the bonding includes: applying an adhesive on the predetermined first bonding zone of the sleeve; positioning the cuff material over the sleeve such that a predetermined second bonding zone of the cuff material is aligned with the predetermined first bonding zone of the sleeve; and applying heat to the first and second bonding zones, thereby forming a seal between the elastic cuff material and the sleeve at the first and second bonding zones.

18 Claims, 25 Drawing Sheets

(56) References Cited

U.S. PATENT DOCUMENTS

| | | | | |
|---|---|---|---|---|
| 4,389,734 A * | 6/1983 | Franz | | A41D 13/1227 2/60 |
| 4,752,972 A * | 6/1988 | Neckerman | | A41D 13/1209 66/172 E |
| 4,792,374 A | 12/1988 | Rianda | | |
| 4,918,754 A | 4/1990 | Leatherman et al. | | |
| 5,142,704 A * | 9/1992 | Viemeister | | A41D 13/1218 2/202 |
| 5,189,737 A * | 3/1993 | Ribicic | | A62B 17/003 2/87 |
| 5,540,976 A * | 7/1996 | Shawver | | B32B 27/12 428/373 |
| 5,682,616 A * | 11/1997 | Pisano | | A41B 11/00 2/22 |
| 7,647,648 B2 * | 1/2010 | Komorowski | | A41D 13/0012 2/69 |
| 11,284,651 B2 * | 3/2022 | Parkinson | | A63B 21/0088 |
| 2003/0233695 A1 * | 12/2003 | Golde | | A41D 19/015 2/161.1 |
| 2006/0064797 A1 * | 3/2006 | Pyeatt Rowe | | A41D 15/002 2/244 |
| 2006/0107437 A1 * | 5/2006 | Griesbach, III | | A41D 15/002 2/114 |
| 2008/0092261 A1 * | 4/2008 | Yu | | A41D 19/0089 264/222 |
| 2008/0256677 A1 * | 10/2008 | Loos | | A43B 23/06 2/200.2 |
| 2012/0311753 A1 * | 12/2012 | Kow | | A41D 27/10 2/455 |
| 2014/0157475 A1 * | 6/2014 | Smith | | A41D 19/0044 2/16 |
| 2018/0092412 A1 * | 4/2018 | Genender | | A41D 27/10 |
| 2020/0215788 A1 * | 7/2020 | Zhao | | B32B 27/34 |
| 2023/0397679 A1 * | 12/2023 | Isaac | | A41D 13/1227 |

* cited by examiner

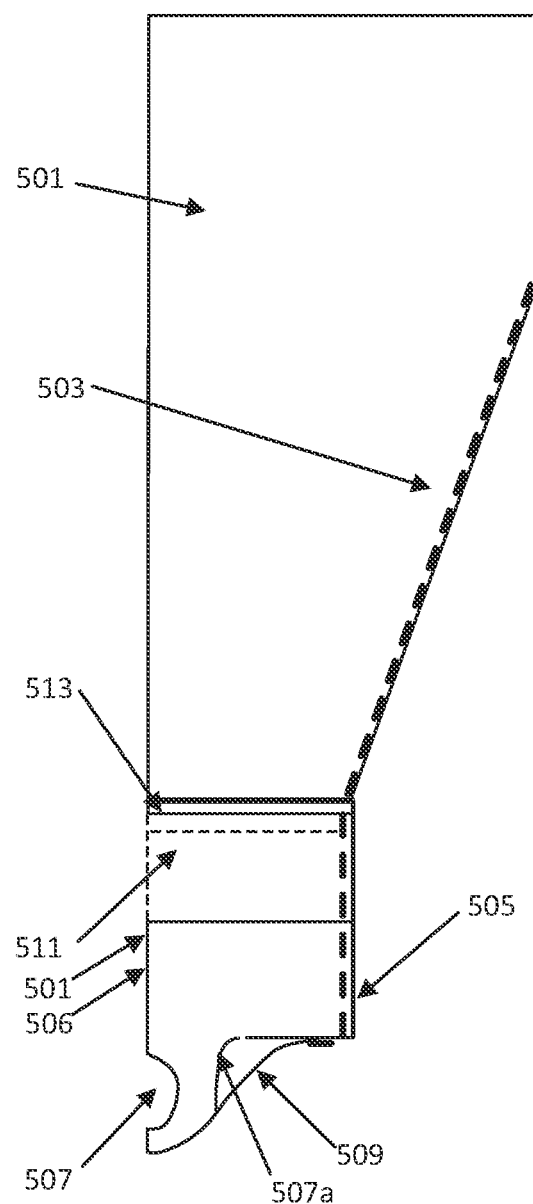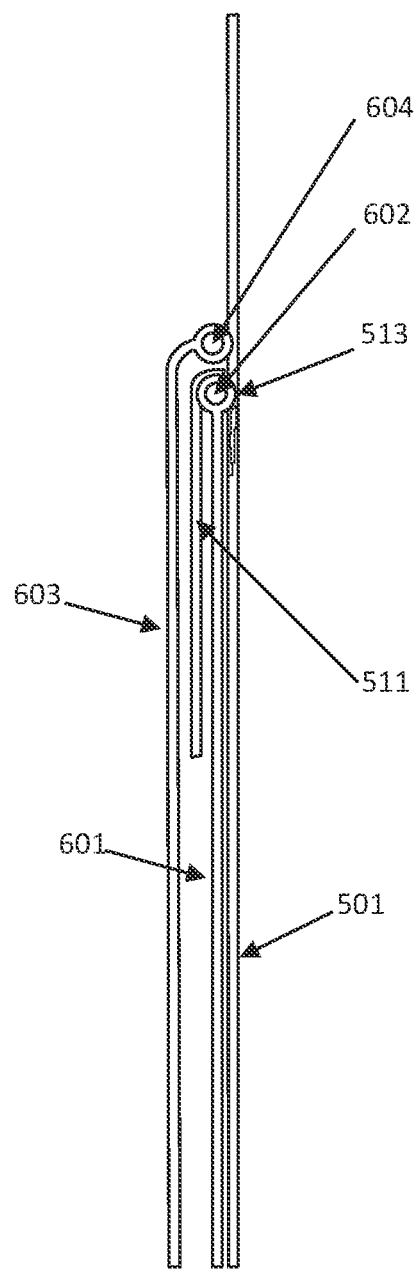
FIG. 9A
FIG. 9B

FLUID MANAGEMENT SYSTEM, APPARATUS FOR MAKING FLUID MANAGEMENT SYSTEM AND METHOD OF MANUFACTURING FLUID MANAGEMENT SYSTEM

FIELD OF THE INVENTION

The invention is directed to a fluid management system for an interface between a sleeve of a protective gown and one or more protective gloves to prevent fluids, such as perspiration from the skin of the user that can collect at the sleeve/glove interface, from breaching the sleeve/glove interface, thereby preventing fluids from the wearer (e.g., perspiration or blood) from exiting the sleeve/glove interface and contaminating an external environment (e.g., a sterile surgical operating room, a biohazard room, a laboratory, a clean room of a manufacturing process, etc.) Conversely, the fluid management system disclosed herein can also prevent external fluids from contacting the skin of the wearer of the protective gown and one or more protective gloves.

BACKGROUND OF THE INVENTION

The following disclosure is described in the context of exemplary medical or surgical environments. However, those of ordinary skill in the art will recognize that the invention can be applied and practiced in any environment or setting in which it is desired to eliminate or reduce contamination between a wearer of a protective gown and an external environment. For example, as would be readily understood by a person of ordinary skill in the art (POSITA), the protective gown disclosed herein can be advantageously utilized in many different settings in which cross-contamination between a wearer of the protective gown and an external environment is desired to be eliminated or reduced. Some exemplary environments include a biohazard room, a sterile laboratory setting, a clean room of a manufacturing process, as well as in food, chemical, and hazardous material handling environments, etc.

In the context of an exemplary surgical setting, as the literature describes, there is a "weak link" in the barrier between the user and their external environment with personal protective equipment (PPE) used in a surgical setting at the interface between the sleeve of a protective gown and the cuff of the protective glove. Without an adequate barrier, the passage of fluids, such as perspiration, from the user's skin to the outside sterile environment may occur, contaminating the environment. In addition, fluids such as blood or other bodily fluids may pass through the interface from the outside environment and make contact with the user's skin.

Collection of perspiration between the sleeve of protective gown and the cuff of a protective glove, in a surgical setting, results in discomfort for the surgeon and increases the risk of breaking sterile technique. Perspiration from the gloved hand/wrist follows the knitted cuff at the distal end of the sleeve of a surgical gown and results in the collection or pooling of moisture between the impervious (waterproof) surgical gown and the cuff of the surgical glove, which is also waterproof.

With pooled moisture (perspiration) between the surgical gown and the cuff of the surgical glove, one cannot change the position of the glove without a break in sterile technique. Therefore, the user's hand and arm can become very uncomfortable in order to avoid breaking the sterile environment.

Fluid leakage from the outside environment to the skin of the user at the glove/gown interface is also a significant problem for surgical and perioperative professionals because direct contact with blood or body fluids can be life threatening, especially when caring for patients with infectious diseases, such as Hepatitis C, HIV, and viral hemorrhagic fevers such as Ebola. Also, contamination of hands and wrists can lead to colonization with drug-resistant bacteria or other germs that could be harmful to patients.

When the glove rolls down or slips on the sleeve, the risk of exposure to blood or body fluids increases. When gloves are pulled up over the wide and baggy cuff and sleeve of the gown, this also creates an exposure risk. An effect called "channeling" can occur when body fluids seep between the inner surface of gloves and the outer surface of the sleeve toward wrists and hands. Glove "roll-down" or slippage can result from a low frictional interface between the interior side of the glove and the surgical gown sleeve. Prior art techniques of using a cuff on a sleeve to prevent leakage of fluids that accumulate inside a glove do not provide a liquid impervious seam between the cuff material and gown sleeve material, resulting in an unacceptable amount of leakage failures. Thus, there is a need for an improved glove/gown interface in the surgical setting.

As mentioned above, there are other non-surgical applications where similar problems may arise. These include, but are not limited to, laboratories, clean rooms, and emergency rooms, as well as in food, chemical, and hazardous material handling environments, which would also benefit from an improved glove/gown interface as disclosed herein.

Additionally, current methods of manufacturing protective gowns have some automated processes like cutting the gown material, but still has many manual assembly operations such as making the sleeve seam, sewing on the knit cuff, and welding ties, Velcro and neck reinforcement materials. Furthermore, current methods of making protective gowns use limited types of materials and designs, in particular, where the cuff and sleeve areas of the gown interact with the protective gloves. Thus, current protective gown designs do not provide a glove-gown interface that is impervious to liquids.

BRIEF SUMMARY OF THE INVENTION

The benefits and advantages of the present invention over existing systems will be readily apparent from the Brief Summary of the Invention and Detailed Description to follow. One skilled in the art will appreciate that the present teachings can be practiced with embodiments other than those summarized or disclosed below.

In view of the above deficiencies of prior art protective gown designs and manufacturing methods described above, the inventors of the present application have made improvements to the current gown designs, materials and methods of making a protective gown with a sealing cuff (aka, Tuff Cuff™) that eliminates or greatly reduces leakage of fluids at the glove-gown interface.

In one aspect, the invention includes a fluid management system for the interface between a sleeve of a protective gown and a protective glove. The fluid management system includes a sleeve member having a first end, a second end, an interior surface, and an exterior surface. The first end of the sleeve member is proximate a distal end of the sleeve of the protective gown and the second end of the sleeve member extends inside of the distal end of the sleeve of the protective gown. A portion of the exterior surface of the sleeve member proximate the second end is in contact with a portion of an interior surface of the sleeve of the gown. There is a cuff member having a first end, a second end, an interior surface, an exterior surface. The interior surface of the cuff member faces and is moveable with respect to portions of the exterior surface of one or both of the sleeve member and the sleeve of the protective gown to enable the insertion of a cuff ring of the protective glove between the interior surface of the cuff member and the exterior surface of one of the sleeve member or the sleeve of the protective gown.

In other aspects of the invention, one or more of the following features may be included. The cuff member may include a retention member to secure the cuff ring of the protective glove in place between the interior surface of the cuff member and the exterior surface of one of the sleeve member and the sleeve of the protective gown. The interior surface of the sleeve member may comprise a moisture wicking material and the exterior surface of the sleeve member may comprise an impervious material. The interior surface and the exterior surface of the sleeve of the protective gown each may comprise an impervious material. The interior surface of the cuff member may face and be moveable with respect to the exterior surface of both of the sleeve member and the sleeve of the protective gown. The first end of the cuff member may be affixed to the first end of the sleeve member and may be foldable onto the portions of the exterior surfaces of both of the sleeve member and the sleeve of the protective gown. The sleeve member may extend beyond and outside of the distal end of the sleeve of the protective gown. The cuff ring of the protective glove may be sandwiched between retention member of cuff member and the exterior surface of the sleeve of the protective gown. Proximate to where the first end of the cuff member is affixed to the first end of the sleeve member there may be included a dead space between the interior surface of the cuff member and the exterior surface of the sleeve member to trap leaked fluid.

In yet other aspects of the invention, one or more of the following features may be included. The cuff member may be formed by the distal end of the sleeve of the protective gown and the distal end of the sleeve of the gown may be folded onto only the exterior surface of the sleeve of the gown proximate the first end of the sleeve member. The cuff ring of the protective glove may be sandwiched between retention member on the distal end of the sleeve of the protective gown and the exterior surface of the sleeve of the protective gown. Proximate where the distal end of the sleeve of the gown is folded onto only the exterior surface of the sleeve of the gown there may be included a dead space between the exterior surface of the cuff member and the exterior surface of the sleeve member to trap leaked fluid. The cuff member may be formed by the distal end of the sleeve of the protective gown and the sleeve member may extend beyond and outside of a distal end of the sleeve of the protective gown. The cuff ring of the protective glove may be sandwiched between the distal end of the sleeve of the protective gown and the exterior surface sleeve member. The cuff ring of the protective glove may abut the retention member and the retention member may be spaced a distance from the distal end of the sleeve of the protective gown and laminated between the interior surface of the sleeve of the protective gown and the exterior surface of the sleeve member. The sleeve member and the cuff member may be tubular in shape.

In some embodiments, a method of manufacturing the protective garment, includes: providing a cuff material; providing a sleeve of a protective garment; and bonding the cuff material to the sleeve at a predetermined first bonding zone of the sleeve, wherein the bonding includes: applying an adhesive on the predetermined first bonding zone of the sleeve; positioning the cuff material over the sleeve such that a predetermined second bonding zone of the cuff material is aligned with the predetermined first bonding zone of the sleeve; and applying heat to the first and second bonding zones, thereby forming a liquid impermeable seal between the elastic cuff material and the sleeve at the first and second bonding zones, wherein the second bonding zone is located so as to provide a foldable portion of the cuff material located proximally from the second bonding zone when in an unfolded state, and wherein the foldable portion is configured to fold over and cover the second bonding zone in a folded state. In some embodiments, the cuff material comprises an elastic cuff material configured to be stretched by 10% to 40% when applied onto the garment sleeve.

In accordance with some embodiments, a system for manufacturing a protective garment, includes: a mandrel assembly configured to receive a sleeve of the protective garment thereon; a multi-prong assembly configured to hold a tubular elastic cuff member in an expanded state; a cuff clamping assembly configured to clamp the tubular elastic cuff member, when in an expanded state, onto the sleeve and the mandrel assembly; and a heating assembly configured to apply heat to a predetermined first bonding zone of the tubular elastic cuff member and a predetermined second bonding zone of the sleeve, thereby heating an adhesive disposed between the first and second bonding zones to create a liquid impermeable seal between the tubular elastic cuff member and the sleeve at the first and second bonding zones.

In further embodiments, a protective garment, includes: a sleeve; a cuff member attached and sealed to an outer surface of the sleeve, the cuff member including: a first bonding zone attached and sealed to a second bonding zone of the sleeve; a foldable cuff portion extending proximally outwardly from the first bonding zone in an unfolded position and configured to fold over and cover the first bonding zone in a folded position; and a liquid impermeable interface between the first and second bonding zones. It has been found that leakage at the cuff/sleeve interface (a.k.a., seam) can be eliminated or at least significantly reduced by implementing the teachings of the present disclosure, as described in further detail herein.

These and other features of the invention will be apparent from the following detailed description and the accompanying figures.

BRIEF DESCRIPTION OF THE FIGURES

FIG. 9A is a cross-sectional view of a sleeve of the gown of FIG. 8 in accordance with some embodiments of the invention;

FIG. 9B is a cross-sectional detail view of the sleeve of FIG. 9A with inner and outer gloves shown in accordance with some embodiments of the invention;

DETAILED DESCRIPTION OF THE INVENTION

Figure 1A:
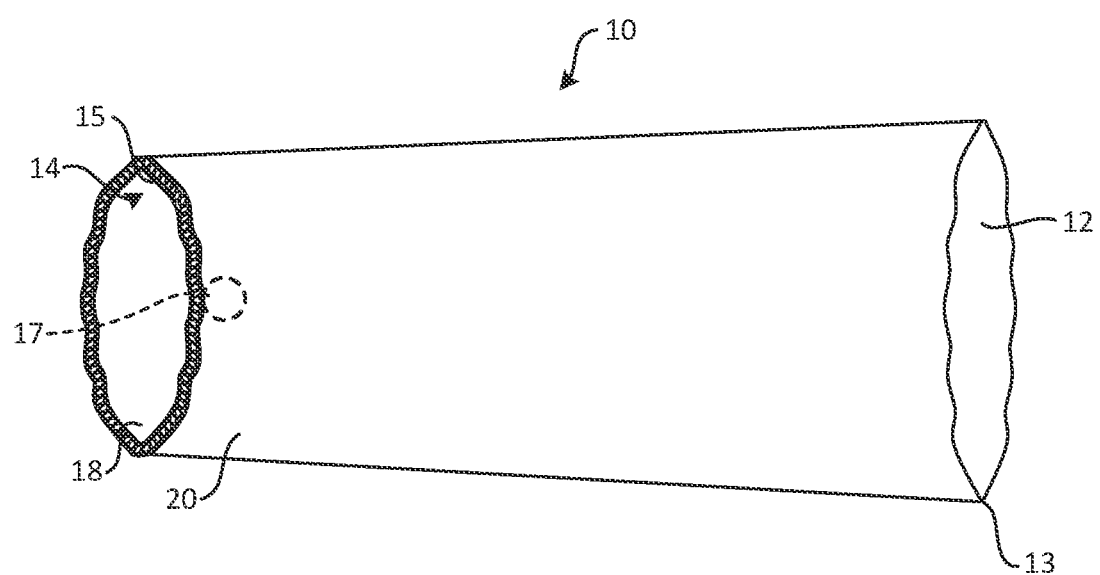
FIG. 1A is a perspective view of an embodiment of a sleeve member, in accordance with some embodiments of the invention.

The disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments, as the skilled artisan would recognize, even if not explicitly stated herein. Any dimensions included in the figures or used herein are merely exemplary and not limiting.

Descriptions of well-known components and processing techniques may be omitted to not unnecessarily obscure the embodiments of the disclosure. The examples used herein are intended merely to facilitate an understanding of ways in which the disclosure may be practiced and to further enable those of skill in the art to practice the embodiments of the disclosure. Furthermore, the methods and processes described herein are merely exemplary and do not limit the scope of the disclosure. For example, the order of steps may be changed, steps may be altered, and/or steps may be omitted or added, to the exemplary methods and processes described herein without departing from the scope of the disclosure, as would be understood by persons of ordinary skill in the art. Accordingly, the examples and embodiments herein should not be construed as limiting the scope of the disclosure. Moreover, it should be noted that while an aspect of the invention is described herein in connection with a surgical glove and a surgical gown, the invention is not limited and it may be used in other applications, e.g. food, chemical, hazmat, laboratories, clean rooms, and emergency rooms, and the concepts may be applied to other articles of protective gear.

The use of wicking sleeve to decrease accumulation of moisture/fluid between the sleeve of protective gown (e.g. a surgical gown) and the cuff of a protective glove (e.g. a surgical glove) is described below. This aspect of the invention, may be used alone or, in combination with other components, to a form fluid management system for the interface between the sleeve of a protective gown and the cuff of protective glove to prevent both perspiration collecting at the gown/glover interface, as well as to prevent fluids from the outside environment penetrating the gown/glove interface and coming into contact with the skin of the person wearing the gown/glove.

Figure 1B:
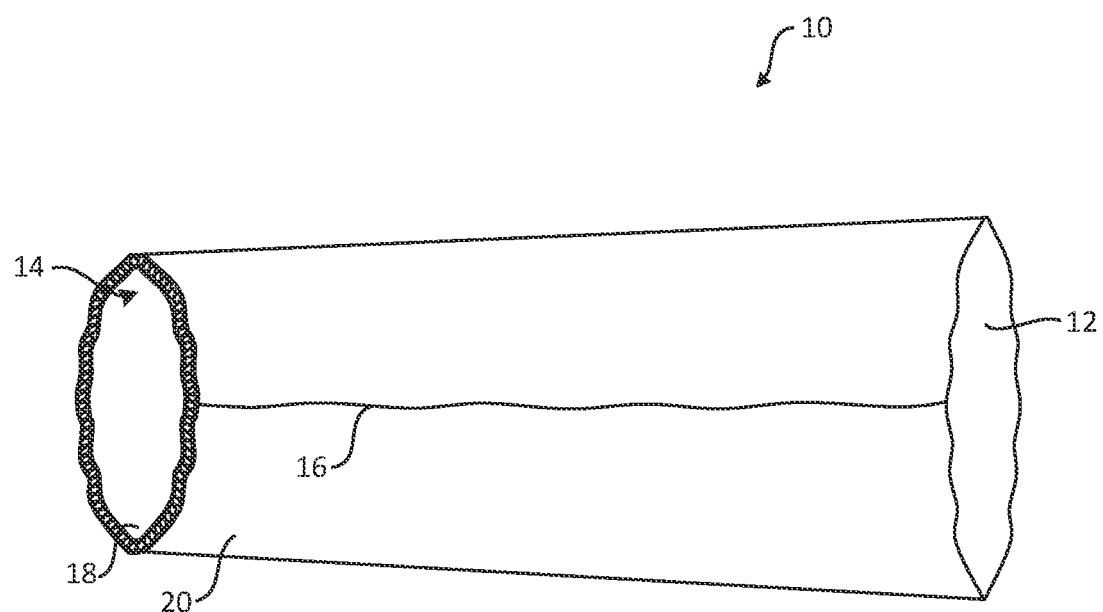
FIG. 1B is an alternate perspective view of the sleeve member shown in FIG. 1A.
Figure 2A:
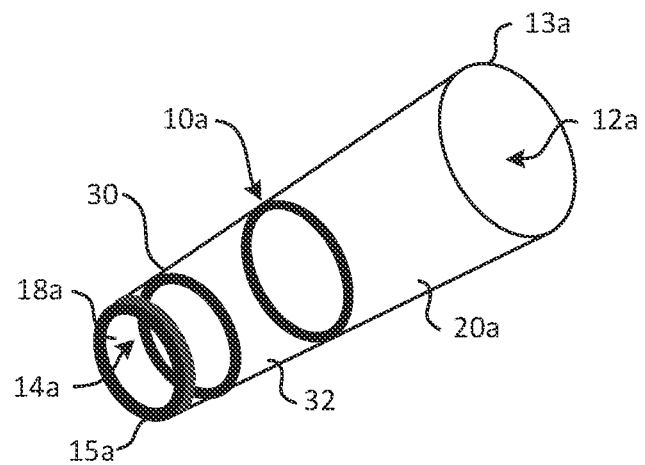
FIG. 2A is a perspective view of another embodiment of a sleeve member, in accordance with some embodiments of the invention.
Figure 2B:
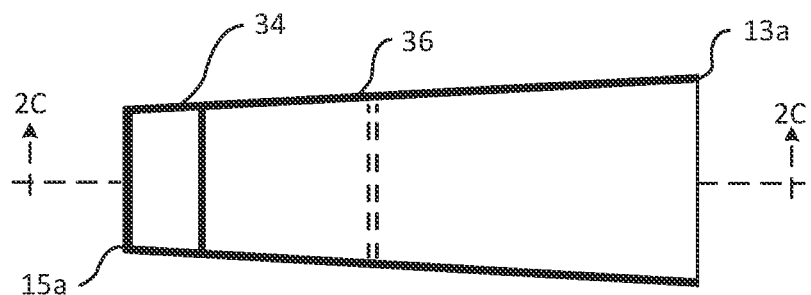
FIG. 2B is a side elevational view of the sleeve member shown in FIG. 2A.
Figure 2C:
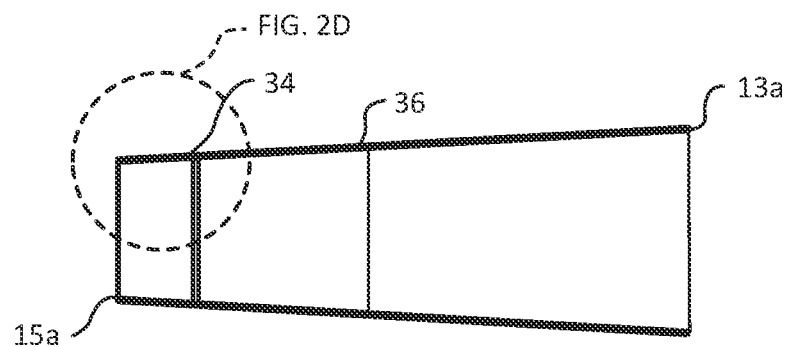
FIG. 2C is a cross sectional view of the sleeve member shown in FIG. 2B taken along lines A-A.
Figure 2D:
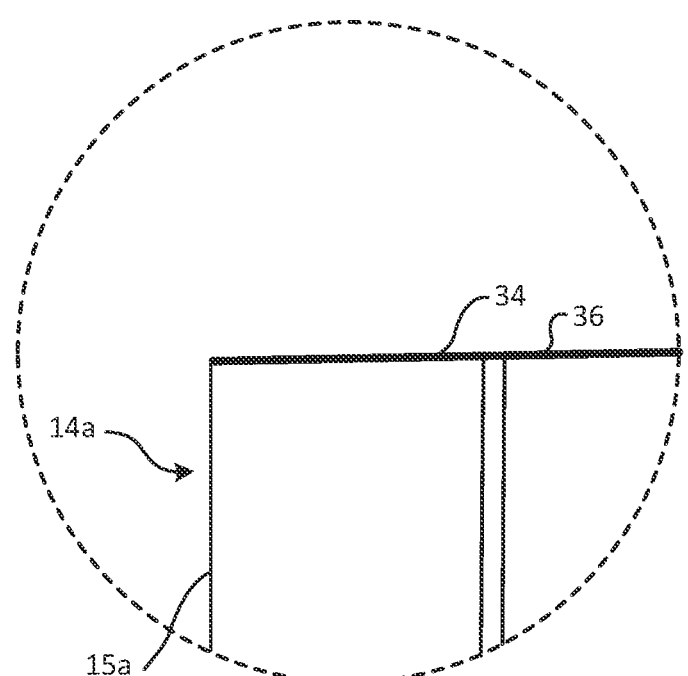
FIG. 2D is an enlarged view of area B of the sleeve member shown in FIG. 2C.

The sleeve 10, according to an aspect of the disclosure, is shown in FIGS. 1A and 1B. Sleeve 10 may be tubular in shape and may include a moisture/fluid management material, such as a wicking material. Sleeve 10 may include a forearm opening 12 and a wrist opening 14, and a user's hand may be inserted into the forearm opening 12 and out through the wrist opening 14 so that the sleeve is worn by the user on their forearm. At each opening, there may be included elastic stitching bands, such as band 13 around the circumference of forearm opening 12 and band 15 around the circumference of wrist opening 14, to ensure a secure fit for sleeve 10 when donned on a user's forearm. The sleeve may optionally include an opening 17 for a user's digit (e.g. a thumb) to secure the wrist opening 14 of sleeve 10 in a position about the user's palm to be well positioned to absorb perspiration.

The forearm opening 12 is larger-in-size than the wrist opening to accommodate the larger diameter of a user's forearm as compared to the user's wrist. The size of the openings and the length of the sleeve may be made of various sizes to accommodate various size users or as a "one size fits all."

Sleeve 10 may be formed by taking a flat piece of material and rolling it into a tubular shape, which may then be sewn at both ends with an Elastane thread, for example, or affixed using a binder material, heat, ultrasonic welding, or other means known in the art. The flat piece of material may be formed of multiple layers of material including moisture wicking material on one side of the fabric and an impervious material on the opposite side, for example. When rolled the moisture wicking material may be disposed on the interior surface 18 of tubular sleeve 10 and the impervious material on the exterior surface of the sleeve 10, forming a dual layer sleeve.

The sleeve 10 may be made as an independent article, which is initially free of the sleeve of the protective gown/garment, or it may be affixed in one or more places to the gown/glove. The sleeve 10 may, alternatively, be formed as an integral part of the sleeve of protective gown/garment. Also, a full sleeve need not be used and instead one or more strips or other structure structures may be used.

An alternative embodiment of the sleeve according to an aspect of this disclosure is depicted as sleeve 10a in FIGS. 2A-2D. Like sleeve 10, sleeve 10a may be tubular in shape and may include a forearm opening 12a, a wrist opening 14a. A user's hand may be inserted into the forearm opening 12a and out through the wrist opening 14a so that the sleeve is worn by the user on their forearm. At each opening, there may be included elastic stitching bands, such as band 13a, around the circumference of forearm opening 12a and band 15a, around the circumference of wrist opening 14a, to ensure a secure fit for sleeve 10a when donned on a user's forearm. The sleeve may optionally include an opening (not shown) for a user's digit (e.g. a thumb) to secure the wrist opening 14a of sleeve 10a in a position about the user's palm to be well positioned to absorb perspiration.

Sleeve 10a may include additional elastic banding/stitching rings 30 and 32 about the circumference of sleeve 10a positioned between forearm opening 12a and wrist opening 14a. These banding rings may be used to form the cuff member described below and used to hold in place a cuff ring of a protective glove. For example, portion 34 of sleeve 10a may be folded over to overlay portion 36 to form a cuff member with the exterior impervious layer of portion 34 facing and in contact with the exterior impervious layer of portion 36. A cuff ring of a protective glove may be inserted into the cuff member formed by portion 34 folded on to portion 36, as is described in FIG. 3, for example.

A fluid management system according to aspects of the disclosure may be deployed in accordance with multiple embodiments. Three possible examples include but are not limited to:

1. The sleeve of the fluid management system can be self-contained and separate from the gown/garment. For example, a sleeve containing the moisture management fiber/material.
2. The sleeve of the fluid management system may be attached to the inner surface of the gown/garment and may be in the form of a strip, band, circumferential sleeve, or some other shape/configuration.
3. The sleeve of the fluid management system may be incorporated into the gown/garment as an integral part/component/layer of the gown/garment. For example, a moisture wicking laminate or layer on the inner surface of the gown/garment.

The sleeve of the fluid management system may use textiles that may be worn on all extremities of the body including, but not limited to between the hand/wrist and forearm. The sleeve of the fluid management system may be made of knit, woven, non-woven, ultrasonic bonded, welded or heat-sealed material. The sleeve of the fluid management system may be made of natural or synthetic fibers or blends thereof. Each side of the system may be made with or without coatings or films. For example, a laminated material may be used with one side having its own fluid management system, while the outside may be impervious. In all cases, whether formed of natural or synthetic materials, the textile fluid management system may be composed of highly wicking material with high moisture pick-up capability.

The natural or synthetic materials of the sleeve of the sleeve of the fluid management system may include additives, including but not limited to organic material, nanoparticles of various types, chemicals, heavy or light metals, waxes, water based anti-microbial(s), including but not limited to chitosan.

The sleeve of the fluid management system may take a multitude of configurations, such as a one-piece tubular sleeve or a single piece flat fabric that, through an attachment process, may be located appropriately on the hand/wrist. Either of these or other configurations can be independent from and/or part of the surgical/protective gown/garments. The sleeve of the fluid management system may be used in the form of other types of garments or sleeves to be worn/applied/used in connection with various parts of the body and various garments.

The following are some exemplary features and benefits of the fluid management system according to aspects of the disclosure:

The creation of a moisture management zone that is independent of and/or an integral part of the surgical/protective gown/garment.

The creation of an impervious side independent of the surgical/protective gown.

The creation of an independent pathway for moisture that restricts the movement of moisture from the inside of the surgical/protective sleeve to that of the outer layer surgical protective gown.

The creation of a material reservoir that collects moisture from the skin in contact with the surgical/protective glove that allows for transportation (vertical wicking) away from the surgical/protective glove zone.

The creation of a material pathway for moisture to flow from the reservoir to the extremities away from the surgical/protective glove zone where evaporation takes place.

The creation of a mini-environment that decreases the opportunity for infection to migrate away from the moisture management zone closest to the skin.

Utilizes fibers and chemical means to create a mini-environment that effectively enhances moisture management to take place.

To increase the comfort of the user by creating a dryer environment within and between the glove and the hand.

The creation of multiple environments within the surgical/protective glove/sleeve/gown/garment to work together as one master system that manages moisture, comfort, temperature, evaporation and infection within the protective gown/garment.

The creation of a new cuff location and fit on the gown sleeve to accept single or double gloves.

The creation of a process (s) both equipment and process parameters to create a reliable and improved cuff-gown seam.

The creation of materials and material properties that provide an improved seam between a cuff member and a gown sleeve.

The creation of materials and material properties for the cuff that forms a reliable and improved interface with the glove (s).

The creation of a method that enables the use of existing gown sleeves by modifying at least a portion of the diameter of a gown sleeve to facilitate forming an improved seam between a cuff member and the gown sleeve material.

FIGS. 1A and 1B depict two views of one exemplary embodiment, which is in the form of a protective sleeve to be worn on the forearm of a user under the distal end of the sleeve of a protective gown, such as a surgical gown. The protective sleeve may be formed of any material suitable for this application, as described above, and it may be positioned proximate the interface between a protective gown and a protective glove to decrease accumulation of moisture between the sleeve of protective gown and the cuff of a protective glove. The ends of the flat material may be connected by sewing/stitching, by gluing, or by any other suitable means of affixing the ends of the material.

Figure 3:
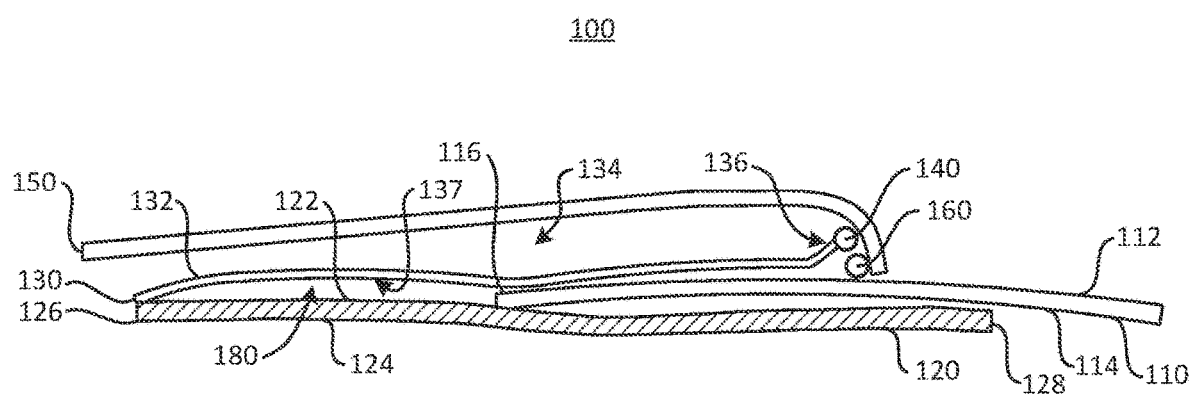
FIG. 3 is a cross-sectional view of a fluid management system, in accordance with some embodiments of the invention.

An embodiment of a fluid management system 100 according to an aspect of this disclosure is shown in FIG. 3. This fluid management system provides both a moisture management function as well as a complete barrier between the user and their external environment. Thus, the system prevents fluids (i.e. perspiration) from travelling from the inside gown/glove to the outside environment and it prevents fluids in the outside environment from penetrating the glove/gown interface and reaching the user's skin.

As shown in FIG. 3, fluid management system 100 is composed of a lamination of three layers. The first layer is the distal end of the impervious surgical gown sleeve 110, which has an exterior surface 112 facing the outside environment and an interior surface 114 facing and in contact with the user. Under the surgical gown sleeve 110, and in contact with at least a portion of interior surface 104 of the surgical gown sleeve 110, is the moisture management/wicking sleeve member 120, which lies directly on the surface of the wearer's hand/wrist. Sleeve member 120 may be comparable to sleeves 10/10a described above in FIGS. 1 and 2, which may be constructed as a dual layer sleeve having an exterior surface 122 formed of an impervious material and an interior surface formed of 124 formed of a moisture wicking material. When the glove 150 is donned and the user perspires, the wicking layer of layer 124 moves moisture from the inside of the inner glove into the sleeve/arm area under the surgical gown.

Wicking sleeve member 120 will typically extend a sufficient distance up the gown sleeve 110 to ensure that perspiration will not be transferred out to the exterior of the surgical gown sleeve 110.

In this embodiment, there may be an impervious member 130, which may be affixed at its first or distal end 132 to the first end 126 of the sleeve member 120. The second end 128 of sleeve member terminates in the interior region of surgical gown sleeve 110. The first or distal end 132 of impervious member 130, which is affixed to a top surface of the first/distal end 126 of the sleeve member 120, extends along and over/facing the top surface 122 of the sleeve member 120 and a portion of outer surface 112 of the impervious gown sleeve 110. The impervious member 130 forms a cuff member 134, which terminates at its second or proximal end 136. The cuff member 134 overlays and is in contact with the distal end 116 of the impervious surgical gown sleeve 110. Thus, the distal end 116 of the impervious surgical gown sleeve 110 is sandwiched between the exterior surface 122 of sleeve member layer 120 (on the bottom) and interior surface 137 of the impervious member 130 (on the top), forming the three-layer laminate.

At the second/proximal end 136 of the impervious member 130 there is affixed a retention member 140 (e.g. rim/band/strip), which may be similar to an O-ring or some other form of band or strip, and which has a level of stiffness, such that the cuff ring 160 of glove 150 may be affixed to it (i.e. by wrapping around a portion of the retention member 140) and allow the cuff ring on the end of the glove 150 to connect to/engage it to produce a "watertight seal" between the impervious gown sleeve 110 and the inner portion of glove 150. Retention member 140 may have a concave shape complementary to cuff ring 160 so that it may receive and engage cuff ring 160 to secure it in place when interlocked.

In the event there is leakage at the seal between the cuff ring 160 of glove 150 and cuff member 134 due to movement of the sleeve 110, for example, there is a dead space 180 between the cuff member 134 and the distal end of gown sleeve 110, which will trap leaked fluid.

Figure 4:
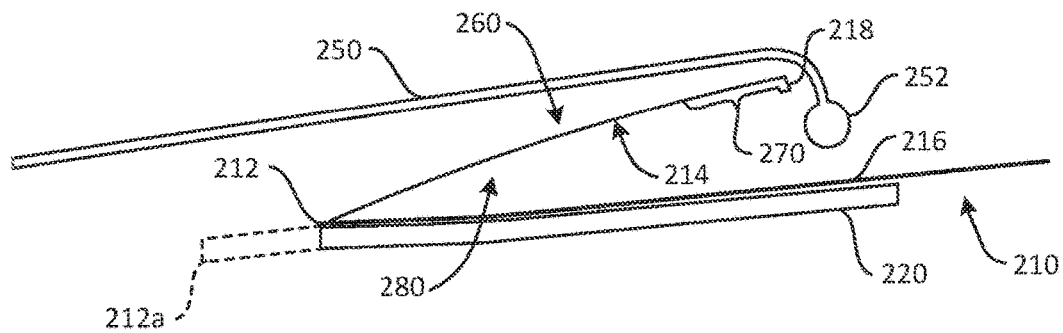
FIG. 4 is a cross-sectional view of another embodiment of the fluid management system, in accordance with some embodiments of the invention.

In another embodiment of the disclosure, fluid management system 200 is shown in FIG. 4. In this embodiment, the separate impervious layer 130 of FIG. 3 may be removed and, instead, the impervious surgical gown sleeve 210 may be folded back over itself at the first/distal end 212 to form gown sleeve portion 214, which faces and overlays gown sleeve portion 216, together forming cuff member 260.

At the second/proximal end 218 of the gown sleeve portion 214 there may be affixed a retention member 270, which may be like the retention member 140 at the proximal end of impervious layer 130 in FIG. 2. The cuff ring 252 of glove 250 may be inserted into the cuff 260 and affixed in place by the retention member 270 by wrapping the cuff ring 252 around a portion of the retention member 270 to allow the cuff ring 252 on the end of the glove 250 to connect to it to produce a "watertight seal." The cuff member 260 formed by gown sleeve portion 214 and gown sleeve portion 216 of impervious gown sleeve 210 are tightly sealed due to the elastic ring around the opening of gown sleeve 210 at end 218 causing the retention member 270 to be forced against the cuff ring 252 in turn sealing it against gown sleeve portion 216.

In the event there is leakage at the seal between the cuff ring 252 of glove 250 and cuff member 260 due to movement of the sleeve 210, for example, there is a dead space 280 between the cuff member 260 and the distal end of gown sleeve 210, which will trap leaked fluid. Also shown in this figure is the sleeve member 220, which may be affixed to the bottom surface of the gown sleeve 210 and terminate proximate the location where the cuff 260 is formed by folding the gown sleeve 210 over on itself, or it may extend beyond this point as indicated in phantom at 220a.

Figure 5:
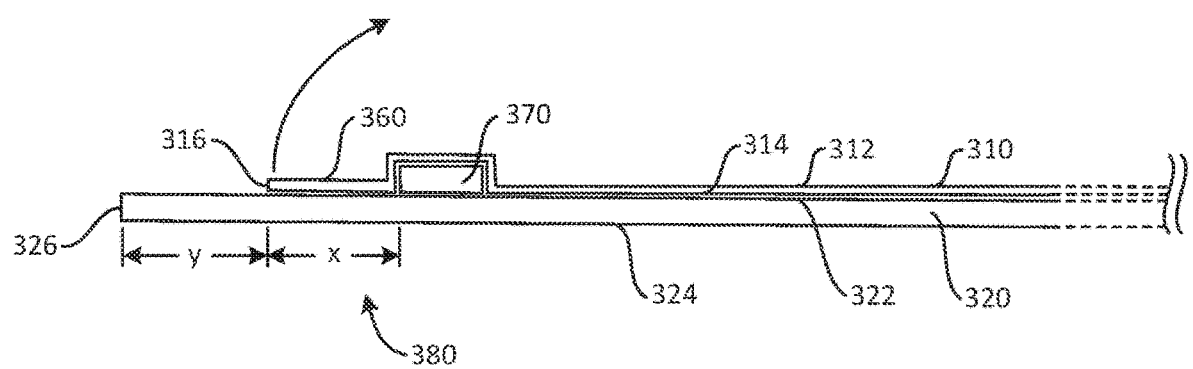
FIG. 5 is a cross-sectional view of yet another embodiment of the fluid management system, in accordance with some embodiments of the invention.
Figure 6:
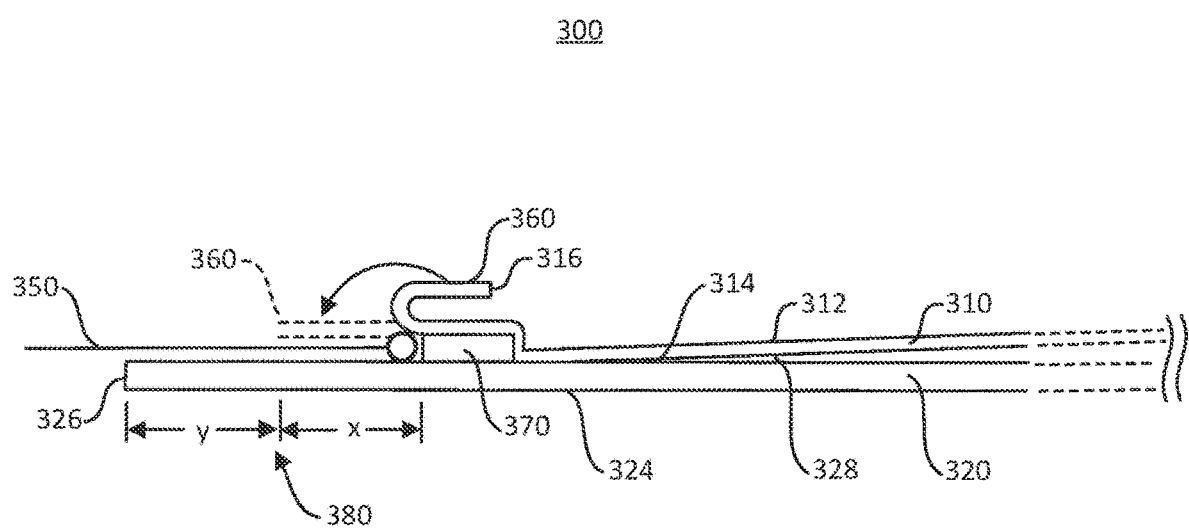
FIG. 6 is a cross-sectional view of yet another embodiment of the fluid management system without the protective glove depicted, in accordance with some embodiments of the invention.

In yet another embodiment, fluid management system 300 is shown in FIGS. 5 and 6 to include impervious surgical gown sleeve 310 under which disposed and bonded thereto wicking layer or sleeve 320. Wicking layer or sleeve 320 may extend a portion of the distance up (but not normally the entire length of) the surgical gown sleeve 310. Wicking layer/sleeve 320 will typically extend a sufficient distance up the sleeve to ensure that perspiration will not be transferred out to the exterior of the surgical gown sleeve 10.

While the surgical gown sleeve 310 includes an impervious material on both the exterior surface 312 and the interior surface 314 thereof, the wicking layer or sleeve 320 may include an impervious material on the exterior surface 322, which will contact the interior surface 314 of the surgical gown sleeve 310 and also the surgical glove 350 when donned, as shown in FIG. 6. The interior surface 324 of wicking layer or sleeve 320 will include a wicking material.

Proximate the distal ends 316 and 326 of surgical gown sleeve 310 and the wicking layer or sleeve 320, respectively, and interposed between the two, may be affixed a retention member 370 (e.g. rim/band/strip). The composite of the surgical gown sleeve 310, wicking layer or sleeve 320, and the retention member 370 maybe formed by adhering the layers together using an adhesive, sonic or heat welding, sewing, or any other suitable means of adhering the items.

There is formed cuff member 360 out of the portion of the surgical gown sleeve 310 between the distal end 316 of surgical gown sleeve 310 and the rim/band/strip 370. There is also a cuff portion 380 formed proximate the first of distal end of wicking layer or sleeve 320. It should be noted that cuff member 360 and cuff portion 380 of the wicking layer 320 are not adhered together. The cuff member 360 and cuff portion 380 extend from the edge of retention member 370 to their respective distal ends.

As shown in FIG. 5, the interior surface of the cuff member 360 of surgical gown sleeve 310 is initially laying directly on the exterior surface of cuff portion 380 of wicking layer or sleeve 20. As can be seen in this view, the cuff portion 360 of the surgical gown sleeve 310 extends a distance X from the rim 370 to its distal end. And, cuff 380 of wicking layer or sleeve 320 extends the distance X and an additional distance Y from the rim 370 (total distance X+Y) to its distal end. In some cases, X may be different than Y. In one embodiment, X may be equal to Y and they may both equal approximately three (3) inches. In this example, cuff member 360 would extend three (3) inches from rim 370, while cuff portion 380 would extend six (6) inches from rim 370.

When the user desires to don the surgical gloves 350, the cuff portion 360 of the surgical gown sleeve 310 is folded onto itself over retention member 370 as shown in FIG. 6. The user then dons the surgical glove 350 such that it covers the exterior of the wicking layer 320 up to the rim 370. Shown in FIG. 6 in phantom is cuff 360' when it is moved back to its original position over the exterior of surgical glove 350. Thus, fluids from the exterior environment are prevented from penetrating to the user's skin and perspiration from the user is prevented from pooling up (as it is wicked away by wicking member/layer 320) and reaching the exterior environment resulting in loss of sterile environment.

Figure 7:
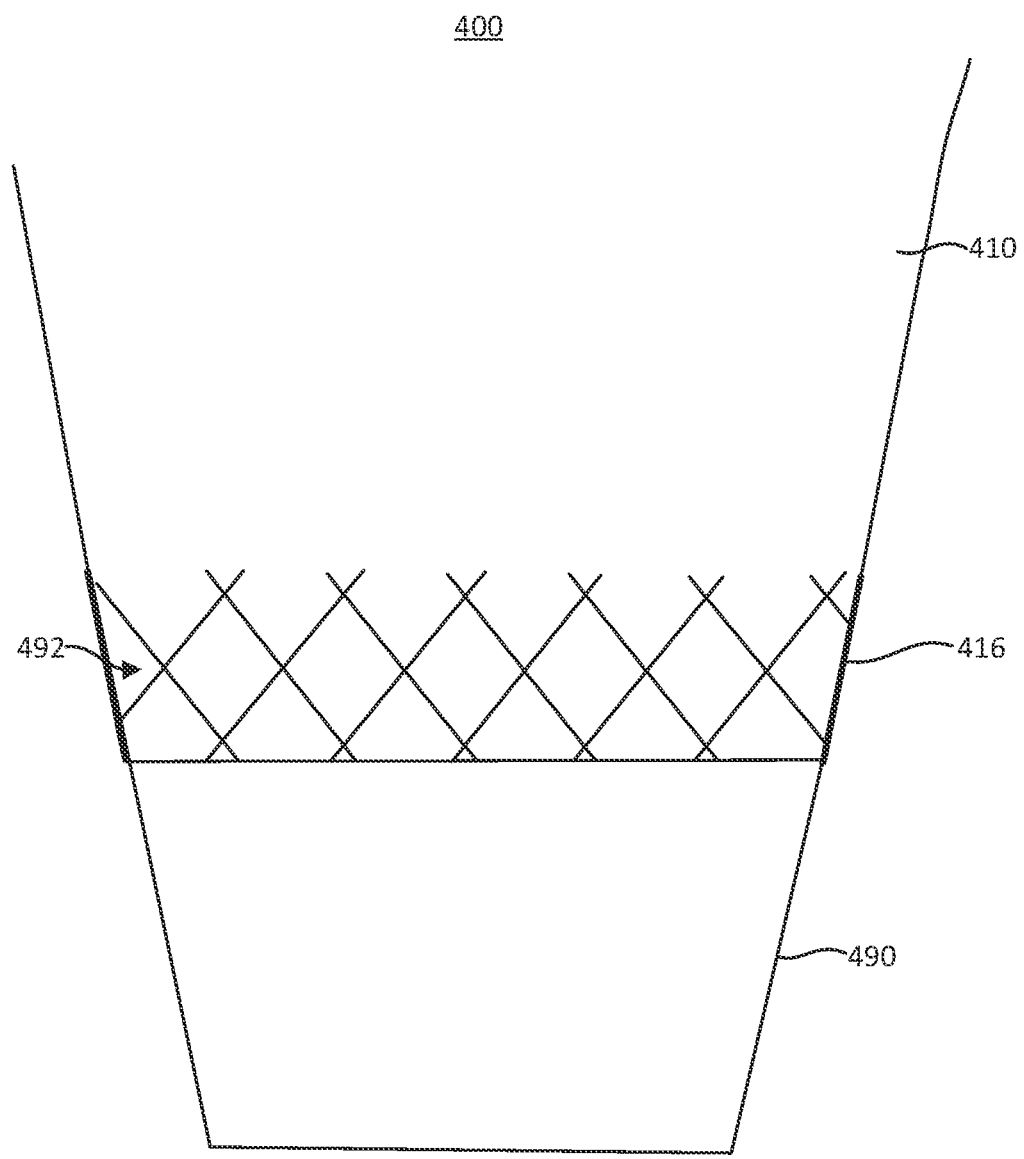
FIG. 7 illustrates a surgical gown sleeve having a rubber cuff welded to a distal end of the sleeve, in accordance with some embodiments of the invention.

A further embodiment of the invention is depicted in FIG. 7 as fluid management system 400. System 400 is shown to include surgical gown sleeve 410 having a distal end 416. In the opening of gown sleeve 410 at distal end 416 is inserted rubber cuff 490, which may be welded to the interior surface of gown sleeve 410 in the region 492. This embodiment may be utilized with the above-described embodiments of FIGS. 3-6. In each of these embodiments the distal ends of the sleeve of the protective gown depicted as 110, 210, and 310, respectively, would be replaced by the rubber cuff 490.

Fluid Management Garment

In some embodiments, the fluid management system may be incorporated into a garment as an integral part/component/layer of the garment. For example, referring now to FIGS. 8 and 9A, a garment 500 having an integrated fluid management system can include a moisture wicking layer 503 generally positioned interior to an inner surface of a sleeve 501 of the garment 500.

Figure 8:
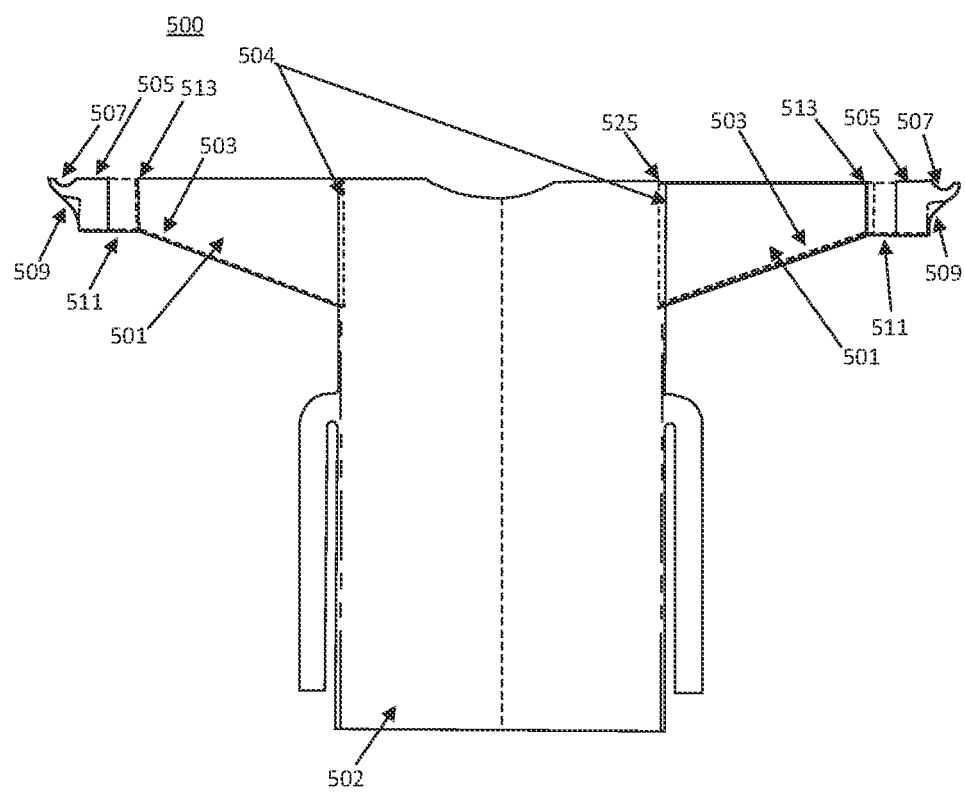
FIG. 8 is a cross-sectional view of a gown having an integrated fluid management system in accordance with some embodiments of the invention.

The garment 500, in accordance with various embodiments, can be any garment wherein fluid management is desirable, including, for example, surgical gowns, protective gear/garments for use in other industries and settings such as food preparation and processing, chemical, hazmat, laboratories, clean rooms, emergency rooms, athletic gear, or combinations thereof. As shown in FIG. 8, the garment 500 can be a surgical gown. Surgical gowns are typically disposable garments having sleeves and can be manufactured from impermeable or fluid-resistant fabrics including nonwoven materials such as polypropylene, polyester, or polyethylene. In order to maintain impermeability, such garments are typically assembled by thermal (e.g., heat welding), chemical (e.g., glues or other adhesives), or mechanical (e.g., adhesive tapes) seaming and not by sewing, Thus, the various components of the garment 500 (e.g., sleeves 501 and body 502) shown in FIGS. 8, 9A, and 9B can generally be attached by such seaming techniques, which will hereinafter be referred to as "welds" (e.g., shoulder weld 504 and cuff weld 513). For example, as shown in FIG. 8, the sleeves 501 of the garment 500 can be welded to a shoulder portion of the body 502 of the garment 500.

The wicking layer 503 can generally extend through at least a portion of the sleeve 501 of the garment 500. For example, as best shown in FIGS. 8 and 9A, in some embodiments the wicking layer can extend through the entire sleeve 501 of the garment 500, from the wrist all the way to the shoulder and even, in some embodiments, extending distally from the wrist to form a hand portion 505 having a thumb loop 507 and/or a palm draping 509 to further wick moisture form the hand area of the wearer. In other embodiments, the wicking layer 503 may only extend through a portion of the sleeve 501 and terminate at a different location such as, for example, on the wearer's forearm, similar to the wicking sleeves illustrated in FIGS. 1A-1B and 2A-2D.

Referring again to FIGS. 8 and 9A, the wicking layer 503 can be retained within the garment sleeve 501 by any suitable means capable of maintaining impermeability of the garment 500. For example, the wicking layer may be retained by either lamination or by more intermittent seaming welds as described above with reference to techniques including, for example, thermal (e.g., heat welding), chemical (e.g., glues or other adhesives), or mechanical (e.g., adhesive tapes) seaming. For example in some embodiments, the wicking layer 503 can be laminated along its entire surface to the interior of the sleeve 501. In other embodiments, the wicking layer 503 can be welded to the sleeve 501 in one or more locations such as, for example, the wrist, the shoulder, the elbow, the forearm, or combinations thereof. The wicking material of the wicking layer 503 can generally be any material suitable for transporting or pulling fluid through the fabric and away from the fluid source. Such materials can include, for example, polyester, polypropylene, merino wool, wool, bamboo, micromodal fabrics, nylon, and combinations thereof.

The hand portion 505 can generally extend distally from the wrist of the sleeve 501. The hand portion can include a thumb loop 507 to provide stability and comfort in the hand area and/or a palm draping 509 to provide moisture management within surgical or other protective gloves by wicking moisture away from the hand area of the wearer. In some embodiments, the thumb loop 507 and palm draping 509 can be formed to provide wicking from the hand while preserving the fit and dexterity afforded by surgical gloves. As best shown in FIG. 9A, the thumb loop 507 can extend downward for insertion of the wearer's thumb. The palm draping 509 can preferably extend in a curvilinear manner between the thumb loop 507 and the wrist portion of the wicking layer 503 which, in some embodiments, can be sized and shaped to cover the heel of the hand. In contrast, the thumb loop 507, on a side 507a opposite the palm draping 509 can extend directly (substantially straight) back to the wrist in a proximal direction so as to leave the back of the hand free and to minimize volume inside the hand portion of the glove. Such a configuration can thereby provide wicking from the hand without negatively impacting fit, dexterity, or freedom of hand movement of the wearer.

As best shown in FIG. 9B, the sleeve 501 of the garment 500 can include a cuff member ("flap") 511 attached thereto. In order to provide secure attachment and preserve impermeability of the garment, the flap 511 can be attached by a seaming cuff weld 513 constructed as described above with reference to techniques including, for example, thermal (e.g., heat welding), chemical (e.g., glues or other adhesives), or mechanical (e.g., adhesive tapes) seaming. The flap 511 can generally be attached at any location along the sleeve 501 suitable for turning the flap 511 down (distally) over the proximal end of a glove 601 (e.g., over the o-ring 602 of a surgical glove) to retain the glove in place and to prevent moisture ingress or egress.

Figure 9C:
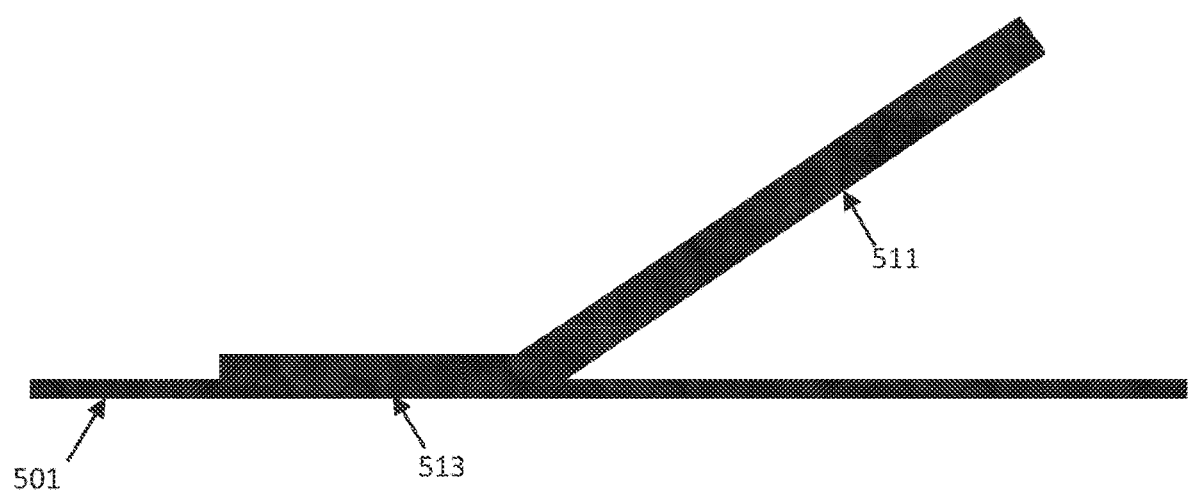
FIG. 9C is a cross-sectional detail view of the sleeve of FIG. 9A without inner and outer gloves shown in accordance with some embodiments of the invention.

Still referring to FIG. 9B, in many applications both an inner glove 601 and outer glove 603 may be worn. In such embodiments the proximal end and o-ring 602 of the inner glove 601 may be positioned between the flap 511 and the sleeve 501 of the garment 500 to retain the glove in place and to prevent moisture ingress or egress via, for example, channeling. The proximal end of the outer glove(s) 603 may be positioned exterior to the flap 511. In such embodiments it may be preferable to position an o-ring 604 of the outer glove(s) 603 proximal to the seaming weld 513 such that an interaction of the o-ring 604 with the joint between the flap 511 and the weld 513 to further retain the glove 603. FIG. 9C illustrates a cross-sectional view of the sleeve 501 and flap 511 attached to an outer surface of the sleeve 501 by the seam weld 513, as shown in FIG. 9B, but the gloves 601 and 603 are omitted for purposes of clarity.

In some embodiments, the flap 511 can be constructed from a same material as the sleeve 501 of the garment 500. In some embodiments, the flap 511 can be constructed of a different material such as, for example, a higher-friction material in order to further prevent slipping of the gloves 601, 603 relative to the exterior of the sleeve 501. Suitable higher friction materials can include, for example, Thermoplastic Polyurethane (TPU), rubber, or any other suitable impermeable material having a higher coefficient of friction than the material of the sleeve 501.

Figure 10A:
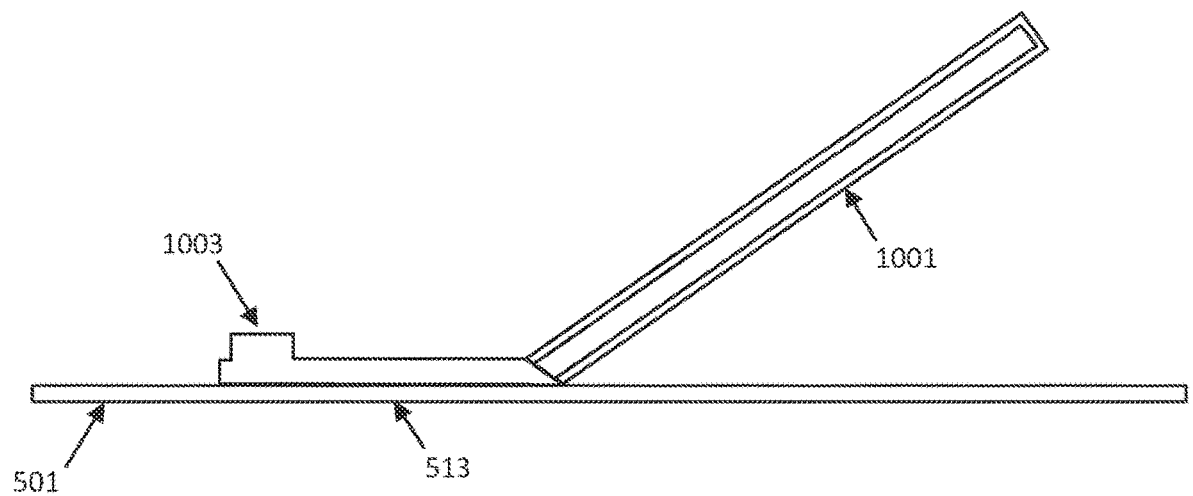
FIG. 10A is a cross-sectional view of a glove retention feature of a gown having an integrated fluid management system according to an aspect of the disclosure.
Figure 10B:
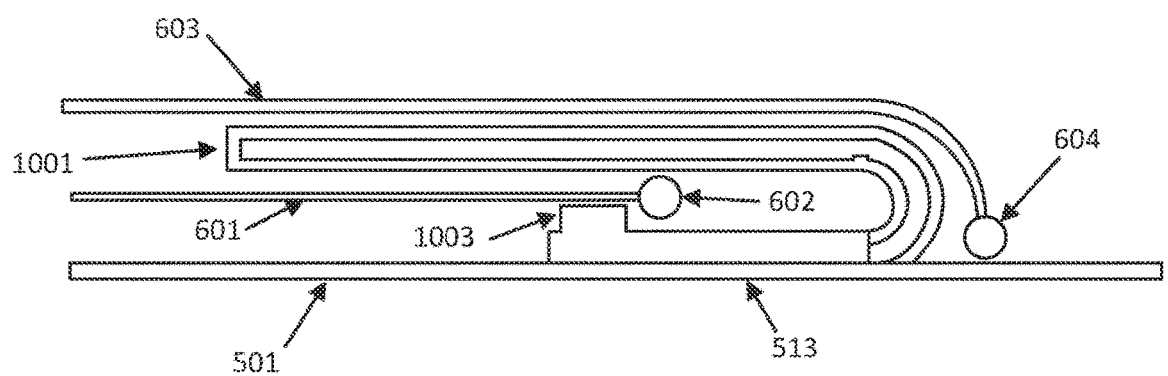
FIG. 10B is a cross-sectional view of the glove retention feature of FIG. 10A deployed to retain gloves in accordance with some embodiments of the invention.

In some embodiments, as shown in FIGS. 10A-10B, a filled flap 1001 can be provided to provide greater stiffness and a more compressive fit to better hold the inner glove 601 and the o-ring 602 of the inner glove 601 against the sleeve 501. In addition, the filled flap 1001 can also better capture the o-ring 604 of the outer glove(s) 603 when the o-ring 604 of the outer glove(s) 603 is positioned proximal to a joint between the weld 513 and the filled flap 1001 because the filled flap 1001 results in a larger/thicker protrusion at the joint. In such embodiments the flap 1001 can be filled with any suitable fluidic material including, for example, gases such as air or nitrogen, liquids such as water or saline. Although it will be apparent in view of this disclosure that the filled flap 1001 can be filled to any desired pressure, the flap may, in some embodiments, preferably be filled to a pressure high enough to enhance compression of the inner glove 601 and the o-ring 602 of the inner glove 601 against the sleeve 501 and low enough to permit turning the filled flap 1001 down (distally) over the proximal end of the inner glove 601 (e.g., over the o-ring 602 of the inner glove 601) to retain the inner glove 601 in place and to prevent moisture ingress or egress.

Still referring to FIGS. 10A and 10B, further retention of the inner glove 601 can be provided by a ridge 1003 extending around a distal portion of the weld 513 in order to provide resistance to distal roll-back or slippage of the o-ring 602 of the inner glove 601. This resistance to distal roll-back or slippage works in cooperation with the compression provided by the flap 511 or filled flap 1001 to trap the o-ring 602 of the inner glove 601 proximal to the ridge 1003 and prevent removal or partial removal of the inner glove 601 in a manner that would break moisture sealing and thus sterility of the environment. The ridge 1003, in some embodiments, can be constructed of a same material as the sleeve 501 and/or the flap 511 or filled flap 1001. In addition, in some embodiments, the ridge 1003 can be filled similar to the filled flap in order to provide additional height/thickness. It will also be apparent in view of this disclosure that, in some embodiments, such as, for example, where it is preferably for the ridge 1003 to be more rigid than the sleeve 501 or the flap 511 or filled flap 1001, the ridge 1003 can also be constructed of other materials such as, for example, rubber, plastic, polymers, surgical stainless steel, combinations thereof, or any other suitable material.

In some embodiments, the flap 511 or filled flap 1001 can also include one or more pull tabs (not shown) in order to facilitate gripping of the flap 511 or filled flap 1001 when turning down (distally) over the inner glove 601 and o-ring 602. In some embodiments, the user can also place a rubber/elastic band or adjustable strap (e.g., an adjustable strap having hook and loop fasteners disposed thereon) to further compress the flap 511 or filled flap 1001 against the inner glove 601 and o-ring 602 to decrease or eliminate fluid/moisture from crossing the glove down interface. In some embodiments, a glue, tape, or adhesive can be applied or attached to the exterior of the sleeve 501, the exterior of the weld 513 and/or an exterior surface of the flap 511 or filled flap 1001 ("exterior surface" referring to the surface that is facing away from the user's arm when the flap 511 or filled flap 1001 is in the turned down position) so as to further prevent distal roll-back or slippage of the inner glove 601.

Figure 11:
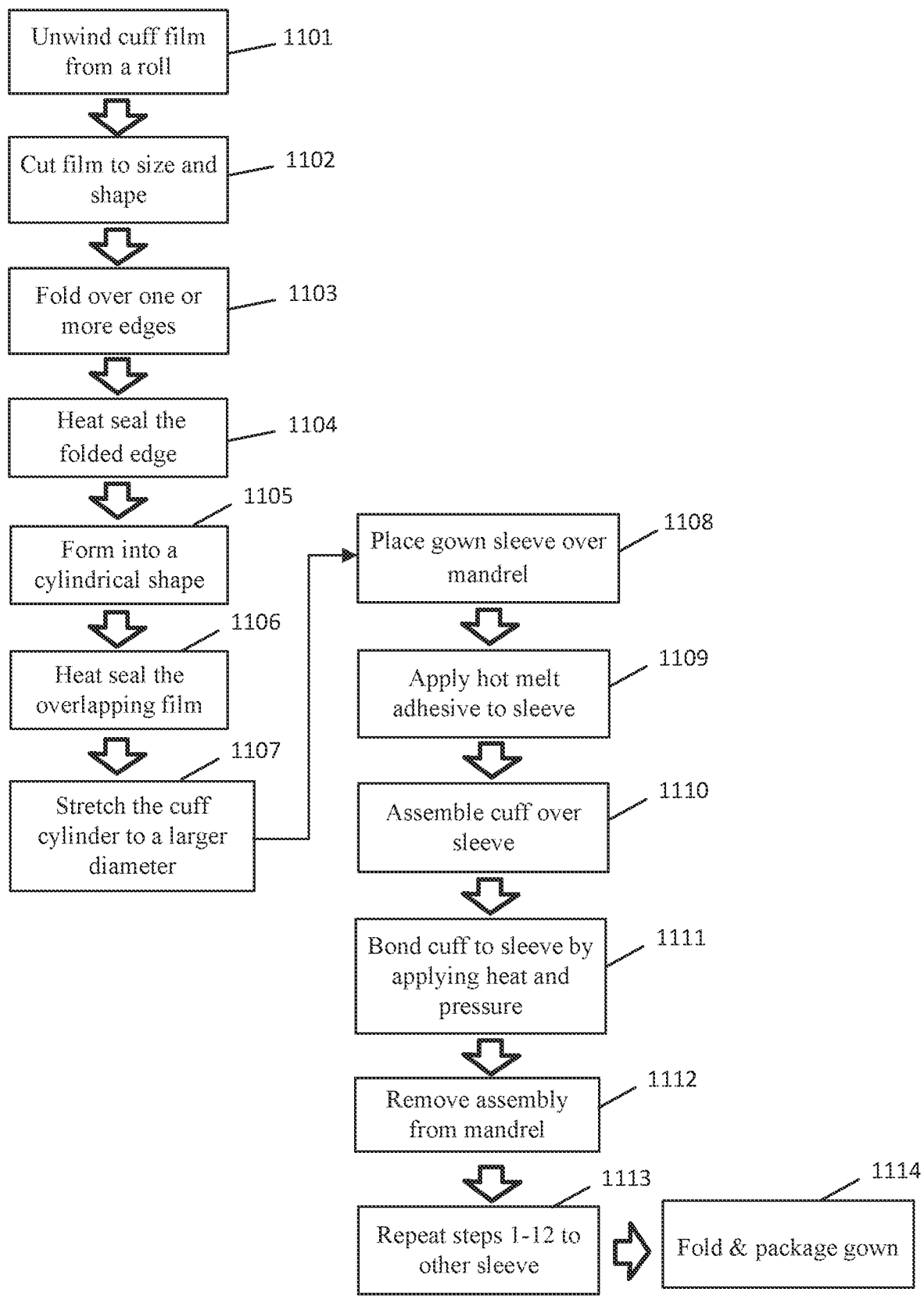
FIG. 11 illustrates a flowchart of a method of manufacturing a protective garment having sleeves with a cuff member attached and sealed to an outer surface of each sleeve in accordance with some embodiments of the invention.

FIG. 11 illustrates a flow chart of a method of making a protective gown having sleeves with a cuff member (aka, Tuff Cuff™) attached to an exterior surface of each sleeve, in accordance with some embodiments. It is understood that the flowchart of FIG. 11 is merely exemplary and is not intended to limit the scope of the invention. For example, as would be understood by persons of ordinary skill in the art, the order of steps illustrated may be changed, two or more steps may be performed in parallel, some steps may be omitted and/or additional steps may be added without departing from the inventive concepts described in the present disclosure.

In some embodiments, the cuff member is made from a film, e.g., an elastic film, that is formed into a cylindrical shape. The film is provided as a flat sheet of material having desired material properties, a desired length and a desired width to provide a desired tubular (e.g., cylindrical or conical) shape and size. In some embodiments, the film is an elastic material that will expand and relax around the circumference of the users arm. Such elastic material could be elastic either in a machine direction or a cross direction, or both, when the elastic material is cut from an elastic material roll. in some embodiments, proximal and/or distal ends of the sheet can be folded over and thereafter the overlapping material can be sealed together to improve the strength and tear-resistance of the sheet. Alternatively, the proximal and/or distal ends may be rolled into an O-ring shape, incorporate an O-ring, or include a hot melt bead to form an O-ring, in accordance with various alternative embodiments. The cuff material sheet is then rolled around a lengthwise axis to form the desired tubular shape, and the overlapping lengthwise edges of the sheet are thereafter attached and sealed to one another to retain the desired shape. The above-described seals can be made by heating and/or bonding with adhesive, in accordance with various embodiments. In some embodiments, the tubular cuff is preferably smaller in diameter than the gown sleeve, which allows the elastic property of the film to improve the impermeability of the interface between the cuff member and the exterior surface of the sleeve, as described in further detail below. In some embodiments, the cuff member is made from an elastic material such as an elastomer, such that the un-stretched diameter of the elastic cuff member can be 20 to 30% smaller than the diameter of the gown sleeve at the area of bonding (i.e., bonding zone). In some embodiments, the cuff member length may range from 3 to 5 inches (76-127 mm) and is preferably 4 inches (101 mm) long. In some embodiments, the cuff member is bonded to the exterior surface of the gown sleeve, and the bond is leak proof as measured by an ASTM 1670 Standard Test Method for Resistance of Materials Used in Protective Clothing to Penetration by Synthetic Blood at the interface between the cuff member and the outer surface of the gown sleeve. In some embodiments, the bond is made with a hot melt adhesive that penetrates into the gown material and forms a leak proof bond. One way to achieve this is by reheating a hot melt adhesive applied at the bonding zone and applying pressure and heat after assembly, as described in further detail below.

At step 1101, a film is unwound from a roll of the film. In some embodiments, the film is made from an elastic material that allows the cuff member made from the film to stretch around the circumference of a wearer's forearm. The elasticity allows the cuff member and underlying gown sleeve to stretch to allow enough room for the wearer's hand to go through the sleeve and thereafter retract around the wearer's forearm to provide a snug fit between the cuff member/sleeve and the forearm. At step 1102, the unwound film is cut to a desired size and shape to form a cuff member, as described above. In some embodiments, the final shape of the cuff member is cylindrical, hence the initial flat sheet of film unwound from the roll is rectangular, in accordance with some embodiments. In alternative embodiments, the final shape of the cuff member may be conical, hence the initial shape of the flat sheet of film can have straight lines and arcs that will form a cylindrical cone shape when rolled and sealed. Those of ordinary skill in the art will know how to cut the unrolled sheet of film to roll into a desired conic shape, having a desired length (with or without folded edges) and desired circumferences. As used herein, the term "tubular" includes both cylindrical and conical shapes.

At step 1103, at least one edge (e.g., a distal edge in a folded position of the cuff member) of the cut film is folded over to improve the strength and tear resistance of the cuff member, and further make it easier for a user to grab the foldable portion of the cuff and fold it over. The folded edge also provides a ridge to lock the o-ring of a protective glove to prevent it from moving. In one embodiment, one fold is made, however, multiple folds can be made in alternative embodiments. Alternatively, the edge may be rolled or formed with an O-ring. At step 1104, the folded edge is thermally bonded so the overlapping material is fixed together. Alternatively or additionally, the bond may be made with adhesive. In some embodiments, both opposing edges (distal and proximal) of the film are folded over and sealed to improve the strength and tear resistance of the cuff member. At step 1105, the sheet of film is formed into a cylindrical or conical shape having desired dimensions. In some embodiments, the sheet of film is wound around a mandrel with overlapping material in a longitudinal direction for sealing the longitudinal overlapping edges to each another to create an overlapping seam. Next, at step 1106, the formed cylindrical (or conical) tube is thermally bonded along the overlapping seam to retain the cylindrical or conical shape of the cuff member. Alternatively or additionally, the bond may be made with an adhesive. In preferred embodiments, the bond leak is proof and is of sufficient strength to prevent delamination.

Figure 12:
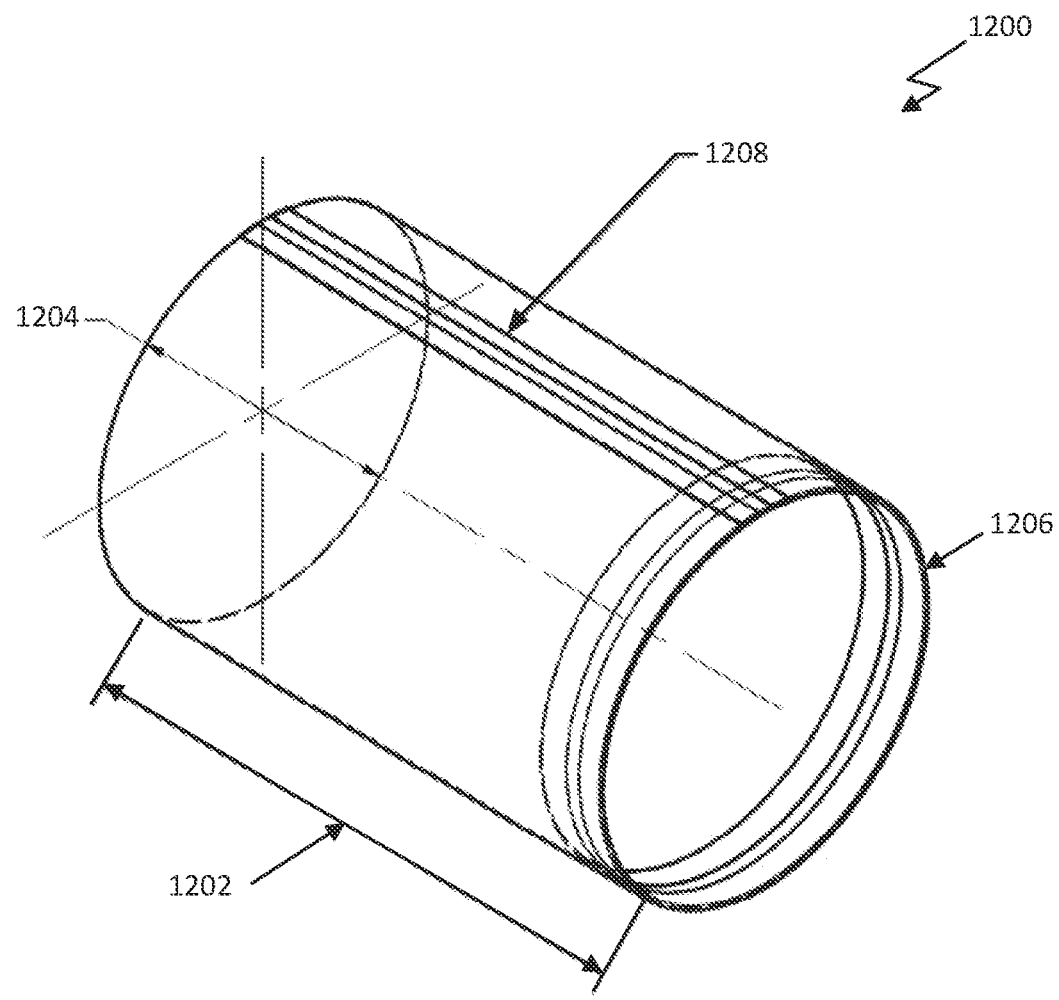
FIG. 12 illustrates a perspective view of a cuff member, in accordance with some embodiments of the invention.

FIG. 12 illustrates a perspective view of a cuff member 1200 that is made after performing steps 1101-1106 described above, in accordance with some embodiments. The cuff member 1200 is cylindrical in shape with a desired length 1202 in the longitudinal direction and desired diameter 1204. As further shown in FIG. 12, the cuff member 1200 includes a folded edge 1206 that can be sealed, as described above, and an overlapping seam 1208 created by sealing overlapping longitudinal edges of the film sheet, as described above. After completing steps 1101-1106, the resulting elastic cuff member 1200 is ready to be placed on to an expanding fork assembly, as described in further detail below.

Figure 13:
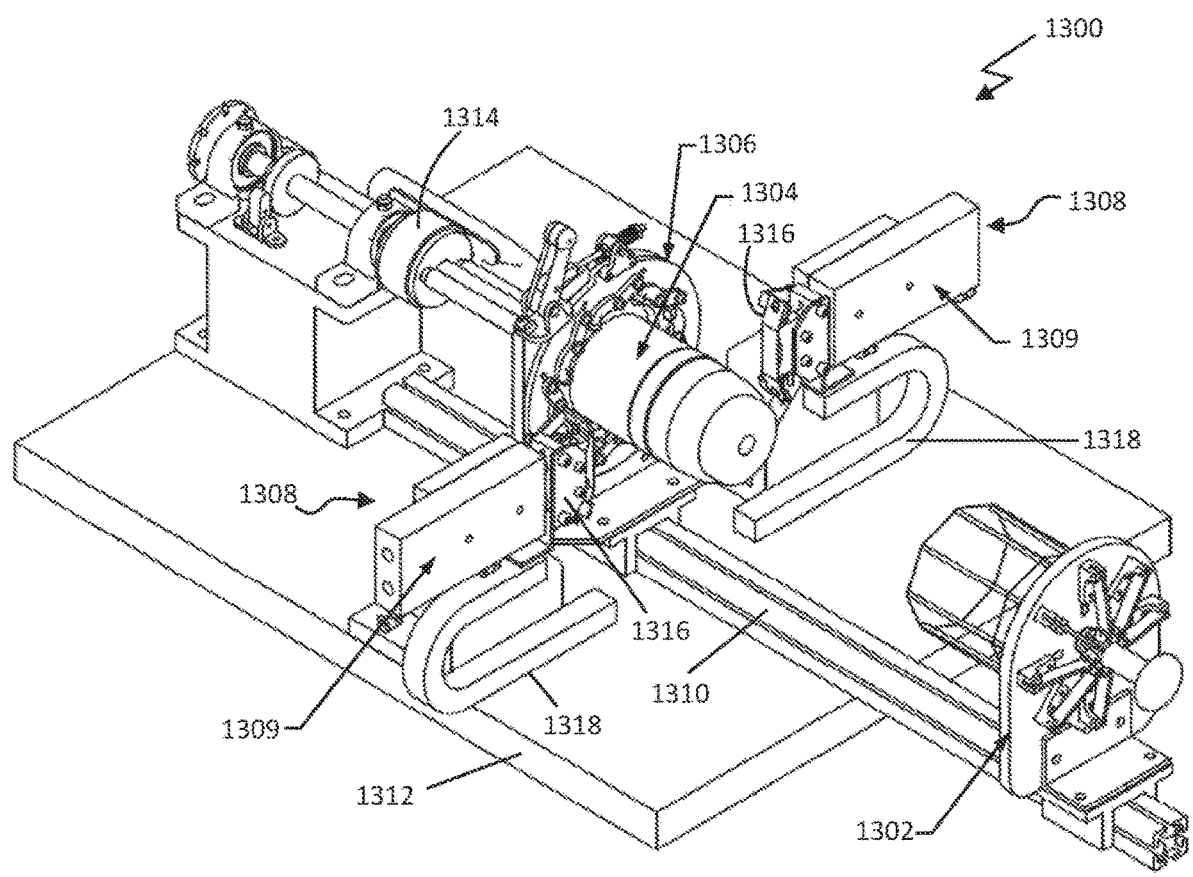
FIG. 13 illustrates a perspective view of a system of manufacturing a fluid management system, in accordance with some embodiments of the invention.

Referring again to FIG. 11, at step 1107, the cuff member 1200 is placed onto a multi-prong fork assembly. In some embodiments, the cuff member 1200 is made from an elastomer, and the elastic cuff diameter in an un-stretched state is smaller than the gown sleeve diameter. Hence, the cuff member is stretched within its elastic limits to a larger diameter to facilitate assembly over the sleeve. One exemplary way to accomplish this is to place the elastic cuff member onto an expanding a multi-prong fork assembly 1302, as shown in FIG. 13, which will be described in further detail below with reference to FIG. 13. Current protective gowns simply sew an un-stretched knit cuff onto a distal end of the gown sleeve and do not provide a liquid impermeable seam. In contrast, in some embodiments, the cuff member of the present disclosure is attached in a stretched state onto an exterior surface of the gown sleeve at a desired proximal location with respect to the distal end of the gown sleeve (with or without a knit cuff) to provide a liquid impermeable sleeve-glove interface, as described herein. When placed onto the sleeve disposed on the mandrel 1304, the stretched cuff member 1200 applies pressure onto the sleeve and hot-melt adhesive applied at the bonding zone to facilitate creation of a liquid impermeable seal or bond between the cuff member 1200 and the sleeve material, as described in further detail below. In some embodiments, the hot-melt adhesive is pressure activated. Furthermore, by applying the cuff member 1200 onto the sleeve and mandrel in a stretched state, diameter mismatches and wrinkles in the sleeve material and/or cuff material can be eliminated or at least significantly reduced, thereby facilitating formation of a liquid impermeable bond between the cuff member 1200 and the sleeve material. Additionally, by placing the cuff member on the gown sleeve in a stretched state, a snug fit around a user's forearm area can be provided. As described in further detail below, the cuff member 12 is placed onto the expanding fork assembly 1302 in a retracted state, and then the forks are expanded to stretch the cuff member before it is placed onto the gown sleeve that is disposed on a mandrel 1304 of FIG. 13, as described in further detail below.

Next, at step 1108, a gown sleeve is placed over the mandrel 1304. The sleeve may or may not be attached to the gown body. In accordance with some embodiments, the mandrel 1304 has an anvil for the cuff bonding process (step 1111). Preferably, the anvil is resilient to conform to the varying gown material layers at the sleeve seam. Because current gown manufacturing processes align the sleeve seal manually before seaming there is a high variability in sleeve diameters. In order to make an impervious seam at the interface between the gown sleeve and the cuff member, it is desirable to eliminate or minimize the number and size of wrinkles at the interface surfaces. In some embodiments, excess sleeve material may be removed before bonding to the cuff member, as described in further detail below. In accordance with some embodiments, wrinkles in the gown sleeve at the interface location where the cuff member will be bonded to the sleeve are eliminated or substantially reduced by using a novel mandrel having an anvil that is made from a silicone or urethane rubber, or other suitable material, having a medium durometer of 50 A±10%. Preferably, the anvil shape and diameter match that of the sleeve at the target interface bonding zone. In some embodiments, the mandrel 1304 may feature vacuum holes to secure and retain the sleeve material close to the mandrel surface, as described in further detail below. In further embodiments, the anvil may further include microfolds to provide an increased anvil circumference, as described in further detail below.

At step 1109, a pressure sensitive hot melt is applied to the sleeve at the target bonding zone. In accordance with some embodiments, a midpoint of the bond zone is in a range 1.50-3.50 inch (38-89 mm) from the knit cuff/sleeve interface, and preferably 2.50 inches (63 mm) from the knit cuff/sleeve interface, as described in further detail below with respect to FIG. 18A. If the sleeve does not end with a knit cuff it may end with a folded seam or an elastic band at its distal end or edge. In this case, a midpoint of the bond zone is in a range 1.50-3.50 inch [38-89 mm] from the distal end of the sleeve, and preferably 2.50 inches (63 mm) from the distal end of the sleeve, as described in further detail below with respect to FIG. 18B. If the sleeve ends with a thumb hole, the midpoint of the bond zone is in the range of 4.50-6.50 inch (114-165 mm) from a distal edge of the thumb hole, and preferably 5.50 inches (140 mm) from the distal edge of the thumb hole, as described in further detail below with respect to FIG. 18C.

In accordance with some embodiments, a standard industrial hot melt system with a non-contact applicator can be used to apply a hot melt adhesive at the bonding zone of the sleeve. A preferred nozzle type is a bead extruder, however, a spray or slot nozzle can also be used to apply the hot melt adhesive, in accordance with various embodiments. In accordance with some embodiments, the hot melt adhesive is applied with a bead weight of 0.1 to 0.5 grams per sleeve to deliver a leak proof bond. In some embodiments, a uniform bead is applied to a rotating sleeve that is rotated by the mandrel 1304 along the entire circumference of the sleeve/cuff interface and the amount of adhesive used is approximately 0.001 gm per millimeter (mm). Alternatively, the hot melt applicator may rotate around a stationary sleeve, in accordance with alternative embodiments. In some embodiments, a styrenic block co-polymer hot melt adhesive manufactured by Bostik, Inc., Wauwatosa, WI, U.S.A., under the product code HM3070, can be used. In some embodiments, the adhesive will have a softening point of 75 degrees C. as measured by Herzog-ASTM E28, and a viscosity of 19,130 centipoise (cPs) (at 110 degrees C.), 6140 cPs (at 130 degrees C.), 2600 cPs (at 150 degrees C.), and 1325 cPs (at 170 degrees C.). As discussed in further detail below, after applying the adhesive at a first temperature (e.g., 75 degrees C.), the adhesive can be reheated at a second higher temperature (e.g., 120-149 degrees C.), which will cause the adhesive to flow into the pores of a woven or nonwoven gown sleeve thereby creating a liquid impermeable seam at the cuff/sleeve interface. Additionally, the adhesive's inherent elastic properties can maintain a strong, liquid impermeable seam between the cuff member and the sleeve in both stretched and relaxed states.

At step 1110, the expanded cuff member (expanded at step 1107) is positioned over the sleeve disposed on the mandrel 1304 without touching the hot melt adhesive with the expanding fork assembly 1302 in an expanded state. A bonding zone of the cuff member is positioned and aligned over the bonding zone of the sleeve and, thereafter, a leading edge of the cuff member 1200 is clamped to the sleeve at multiple points with a clamping unit 1306, as described in further detail below with respect to FIG. 13. After the cuff member 1200 is clamped to the sleeve, the fork prongs of the multi-prong fork assembly 1302 (or finger prongs of a gripper) are withdrawn. When the prongs are withdrawn, the elastic cuff member snaps to a tight fit around the sleeve and mandrel. In some embodiments, the hot melt adhesive is pressure activated such that it begins to cure when the elastic cuff member applies pressure onto the hot melt disposed at the bonding zones between the cuff member and the exterior surface of the sleeve.

Next at step 1111, after the hot melt is applied and the cuff member 1200 is placed onto the sleeve, as described above, the hot melt adhesive is reheated to improve the bond strength and further improve the impermeability of the bond seam between the sleeve and the cuff member 1200. In some embodiments, a reheating assembly 1308 is used to reheat the adhesive to cause the adhesive to flow into the sleeve fabric pores, thereby making the bond seam further impervious to liquids, as described in further detail below with respect to FIG. 13. In some embodiments, the hot melt is heated to a temperature that allows it to flow, preferably 275 degrees F. (135 degrees C.). In accordance with various embodiments, the reheat temperature may range from 250 to 300 degrees F. (121 to 149 degrees C.) depending upon the adhesive properties. In accordance with some embodiments, it has been found that reheating the adhesive at a temperature range of 120-149 degrees C. provides a viscosity that allows enough flow into the garment sleeve pore structures without causing too much flow, thereby allowing the adhesive to remain on the bond interface surfaces between the sleeve and the cuff film material to create a liquid impermeable seal at the interface. Additionally, the amount of adhesive used can play a role in creating a liquid impervious bond between the sleeve and the cuff material. Too little adhesive will not create a suitable bond, while too much adhesive may take too long to cool and set. In some embodiments, 0.8 to 1.2 milligrams (mg) per mm, preferable 1 mg/mm, of adhesive is applied as a uniform bead around the entire circumference of the interface/seal between the cuff material and the sleeve material.

In some embodiments, the reheat assembly 1308 further applies pressure onto a surface of the cuff member at the bonding zone to aid the flow and penetration of hot melt adhesive into the sleeve fabric pores. In some embodiments, the pressure applied is equal to 5-10 pounds per square inch (3,500-7,000 kilogram force per square meter (kgf/sqm)). Furthermore, the tool contact time may range from 2 to 15 seconds, e.g., 7 seconds, in accordance with some embodiments. The combination of heat, pressure, and contact time ensures a leak proof bond between the sleeve material and the cuff member film. It is understood that the combination of heat, pressure and contact time values can be adjusted depending on different intended purposes of the protective gown and/or to support high-speed automation, for example. In some embodiments, a contact surface of a heating member of the reheating assembly is curved to match a curvature of the bond zone. In some embodiments, the heating member moves from a retracted position to an extended position, clamping the laminated layers of the cuff member, hot melt and sleeve against a round anvil of sleeve mandrel. In some embodiments, the laminated layers are rotated by the mandrel to allow the heating elements to reheat the adhesive along the entire circumference (360 degrees) of the cylindrical bonding zone. Several rotation and heating cycles may be performed to achieve the full 360 degree coverage. Although two heating elements 1310 are shown in FIG. 13, in alternative embodiments, there may be one heating element, or three or more heating elements, in accordance with various embodiments.

In accordance with some embodiments, the reheating process includes the following operations:
 a) Extend the heating member(s) to contact a contact portion of the circumference of bonding zone of the cuff member;
 b) Allow the heating member(s) to contact the bonding zone for a predetermined period of time (dwell time) to transfer thermal energy and apply pressure;
 c) Retract the heating member(s) to provide clearance to rotate the mandrel.
 d) Rotate the sleeve mandrel to a next contact position that overlaps the contact portion.
 e) Repeat 1-4 until full 360 degrees of contact coverage is achieved.

To reduce manufacturing time, additional heating elements can be utilized to reduce the number of cycles (steps a-d above). In some embodiments, three or four heating elements are utilized to achieve 360-degree contact coverage in two or three cycles.

Next at step 1112, after the hot melt is cooled, the assembled cuff and sleeve are removed from the mandrel. At step 1113, steps 1101 through 1112 are repeated for the other sleeve of the gown. The finished gown will have one cuff member per each sleeve. Finally, at step 1114, the completed gown is packaged for shipment.

In accordance with an alternative embodiment, the cuff member 1200 can be attached to the gown sleeve during the gown construction stage before the sleeve is attached or sewn to the body of the gown, which can provide manufacturing efficiencies and advantages. In this embodiment, the cuff material is bonded to the sleeve while it is flat before it is seamed into a cylindrical shape and sewn to the gown body. In accordance with some embodiments, the process includes the following steps:
 1. The sleeve is cut to size and shape from the gown material.
 2. The cuff member film is cut to size and shape.
 3. In some embodiments, the cuff member film is an elastomer, and the elastic cuff member film is stretched a predetermined amount (e.g., 10 to 40%) when it is placed on the sleeve material. In some embodiments, the elastic cuff member is stretched in the range of 20 to 30%.
 4. A hot melt adhesive is applied to a first bond zone on the sleeve. In some embodiments, the hot melt adhesive is a pressure-activated adhesive.
 5. A second bond zone of the cuff member is positioned and pressed onto the hot melt and first bond zone of the sleeve. In some embodiments, if the cuff member is an elastic cuff member in a stretched state, the elastic cuff member is maintained in a desired stretched state (e.g., stretched to be 10% to 40% larger in one or more desired directions) by at least two clamps (not shown) on opposites sides of the stretched flat cuff member while the second bond zone of the cuff member is positioned and pressed onto the hot melt and first bond zone of the sleeve.
 6. Heat and pressure are applied to the first and second bond zones, re-melting the hot melt adhesive, creating a leak proof bond and seam between the cuff member and an outer surface of the sleeve.
 7. The bonded sleeve and cuff film are wrapped around a mandrel and overlapping longitudinal edges of the sleeve and cuff film are heat sealed to form the sleeve and cuff longitudinal seams. In some embodiments, the longitudinal seams are formed by an adhesive bond that will not melt, shift or otherwise degrade the seams of the cuff member while making the longitudinal sleeve seam. Alternatively or additionally, in some embodiments, the cuff member is made from a material having a higher melting point than that of the gown sleeve, such that the integrity of the cuff member and cuff member seams will not be degraded when making the longitudinal seam of the gown sleeve.
 8. If desired, a knit cuff is sewn on at the distal end of each sleeve.
 9. Left and right sleeves are then sewn to the gown body.

FIG. 13 illustrates a perspective view of a system 1300 for manufacturing a protective gown having a sleeve with a cuff member bonded thereto, in accordance with some embodiments. The manufacturing system 1300 includes the multi-prong fork assembly 1302, a sleeve mandrel assembly 1304, a cuff clamp assembly 1306 and a reheating assembly 1308. For clarity, a hot melt applicator is not shown, however, its location is above the sleeve mandrel assembly 1304. As further shown in FIG. 13, the multi-prong fork assembly 1302 and the cuff clamp assembly 1306 are movably mounted on a linear track 1310 that is fixed on a platform 1312. The mandrel assembly 1304 is attached to a rotary arm assembly 1314 also mounted on the platform 1312. The rotary arm assembly 1314 is configured to rotate the mandrel 1304 around a longitudinal axis of the mandrel assembly 1304, which is parallel to the linear track 1310. The reheating assembly 1308 includes two linear actuators 1309 and two heating elements 1316 on opposite sides of the sleeve mandrel assembly 1304. Each linear actuator 1309 is configured to move a respective heating element 1316 toward and away from the mandrel 1304, and is mounted on a respective one of two support arms 1318 that are fixed onto the platform 1312 on opposite sides of the sleeve mandrel assembly 1304. Each of the main assemblies 1302, 1304, 1306 and 1308 are described in further detail below.

Figure 14A:
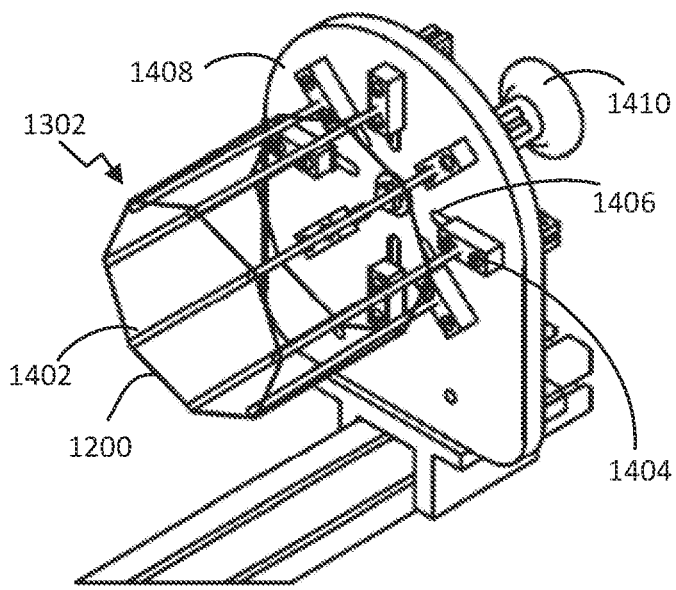
FIGS. 14A-14D illustrate various views of a multi-prong fork assembly of the system shown in FIG. 13, in accordance with some embodiments of the invention.

FIG. 14A illustrates a perspective view of the multi-prong fork assembly 1302 of FIG. 13. As shown in FIG. 14A, the multi-prong fork assembly 1302 includes a plurality of fork prongs 1402 (e.g., 8 prongs) that extend outwardly from a corresponding one of a plurality of mounting brackets 1404. Each of the mounting brackets 1404 are movably coupled within a corresponding radial slot 1406 formed in an assembly plate 1408. Each mounting bracket 1404 is configured to slide within its corresponding radial slot 1406 in a radial direction as an actuating member 1410 is pushed or pulled linearly along a linear axis that is perpendicular to front and back walls of the assembly plate 1408, thereby moving the plurality of fork prongs 1402 into expanded and retracted states. As shown, a cuff member 1200 is held by the fork prongs 1402 in an expanded state.

Figure 14B:
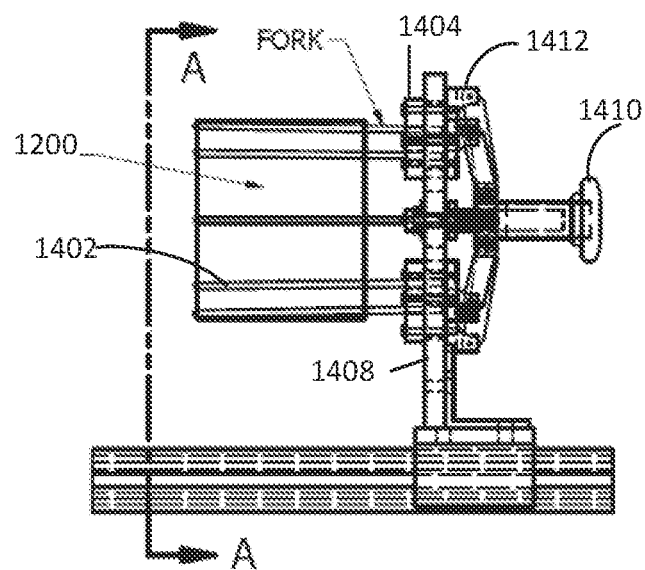
Figure 14C:
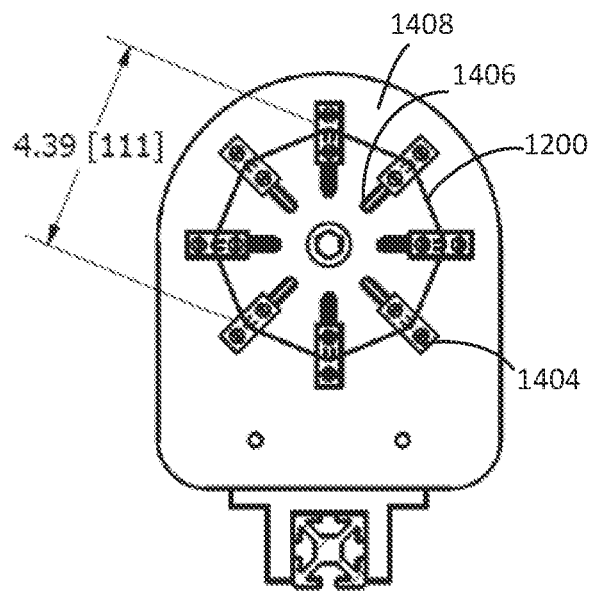
Figure 14D:
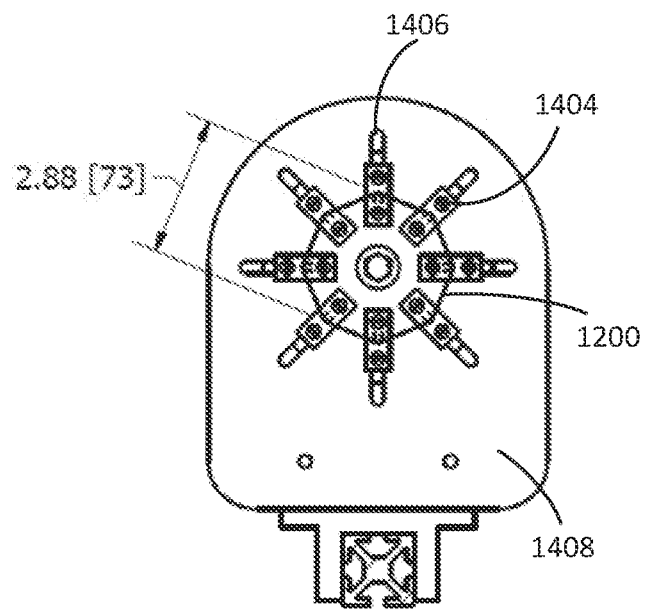

FIG. 14B illustrates a cross-sectional side view of the multi-prong fork assembly 1302. As shown in FIG. 14B, when the actuating member 1410 is pushed toward the assembly plate 1408, each of the mounting brackets are moved radially outwardly in their respective radial slots 1406 to move the fork prongs 1402 radially outwardly to an expanded state. Conversely, when the actuating member 1410 is pulled away linearly from the assembly plate 1408, the mounting brackets are moved radially inwardly to a retracted state. FIGS. 14C and 14D illustrate the multi-prong fork assembly in the expanded state and retracted state, respectively. As shown in FIGS. 14C and 14D, a cuff member 1200 is held by the multiple prongs 1402 in the expanded and retracted states, respectively.

The cuff member 1200 is placed over and around outer surfaces of the multiple fork prongs 1402 in a retracted state. Thereafter, and before positioning the cuff member 1200 over a gown sleeve 501, the fork assembly 1302 is actuated by the actuating member 1410 into an expanded state to stretch the elastic cuff member from its relaxed diameter (e.g., 2.88 inches, 73 mm) to a stretched diameter (e.g., 4.39 inches, 111 mm). After stretching the cuff member 1200 to an expanded state, the cuff member 1200 can be moved over and around the sleeve 501 disposed on the mandrel 1304 without contacting either the sleeve or the hot melt adhesive disposed on the sleeve at the bonding zone of the sleeve. To ensure proper bonding and the formation of a liquid impermeable seal, it is desirable to avoid contact between the cuff member 1200 and the sleeve 501 and hot melt adhesive until the cuff member 1200 is in the correct bonding position. As described in further detail below, after clamping an edge portion of the cuff member onto the sleeve, the fork prongs stay in their expanded state while they are withdrawn. The cuff clamp assembly 1306 holds the cuff member 1200 in position while the forks 1402 are withdrawn and the elastic cuff member 1200 will snap to the sleeve/mandrel diameter to squeeze the outer surface of the sleeve disposed on the mandrel. In some embodiments, after the elastic cuff member 1200 snaps onto the sleeve/mandrel, the elastic cuff member 1200 is still in a stretched state (e.g., its diameter or circumference is 20% to 30% larger compared to its diameter or circumference in an unstretched state). This allows, the cuff member 1200 to apply pressure onto the sleeve and hot-melt adhesive. In some embodiments, the hot melt adhesive can be a pressure-activated adhesive. Thus, when the elastic cuff member 1200 squeezes the outer surface of the sleeve in the bonding zone 1503 (FIG. 15B) where a hot melt adhesive is applied between the cuff member 1200 and the sleeve material 501, the pressure-activated hot melt adhesive will be activated and begin to cure to provide a bond and seal between the cuff member 1200 and the sleeve 501.

In some embodiments, the actuating member 1410 may be operated manually. In alternative embodiments, the actuating member 1410 may be controlled automatically by a controller and actuator (not shown) in an automated manufacturing system and method. Furthermore, it is understood that the multi-prong fork assembly 1302 shown in FIGS. 13, 14A and 14B is one exemplary embodiment for performing the operations of expanding the elastic cuff member 1200, placing the cuff member 1200 over the sleeve 501 disposed on the mandrel assembly 1304, as described above. In alternative embodiments, these or similar operations may be performed instead with a robotic arm having a gripper with multiple fingers. Such robotic arm may be controlled by one or more controllers and actuators that control the movements of the robotic arm, gripper and fingers in an automated manufacturing environment that utilizes automation software and protocols. As used herein, a "multi-prong assembly" can refer to the multi-prong fork assembly 1302 and similar assemblies such as a robotic arm with a multi-finger gripper.

Figure 15A:
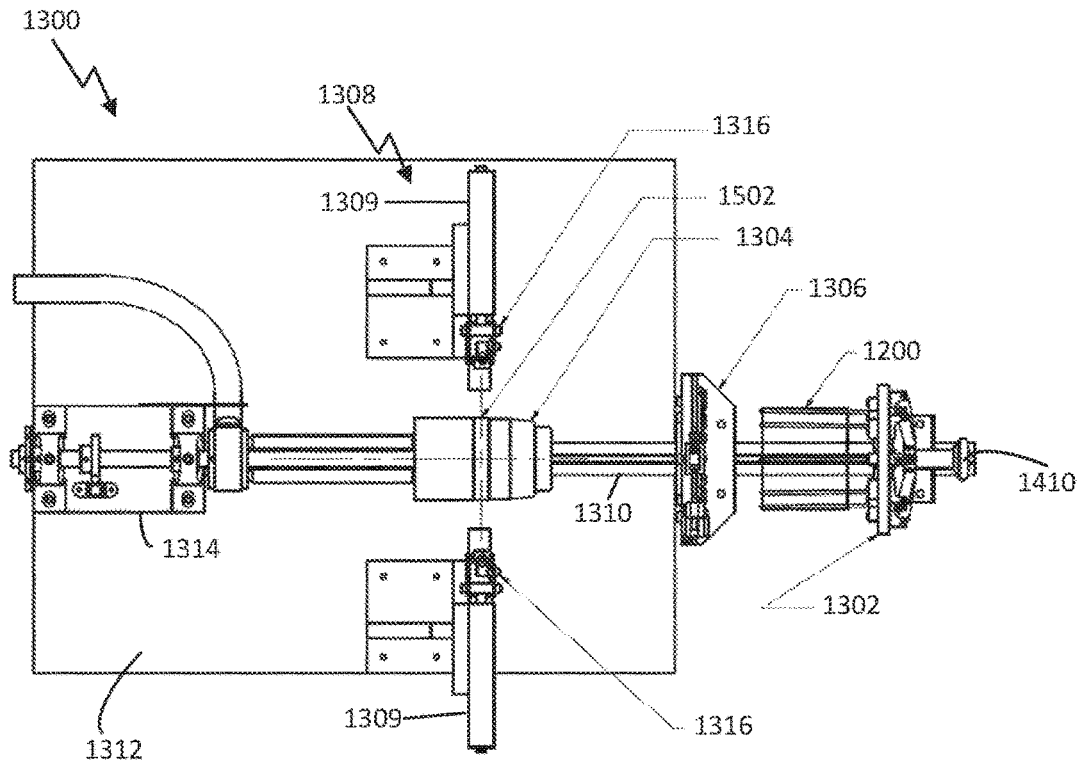
FIGS. 15A and 15B illustrate top views of the system shown in FIG. 13 with and without a protective garment sleeve placed on a mandrel assembly, respectively, in accordance with some embodiments of the invention.
Figure 15B:
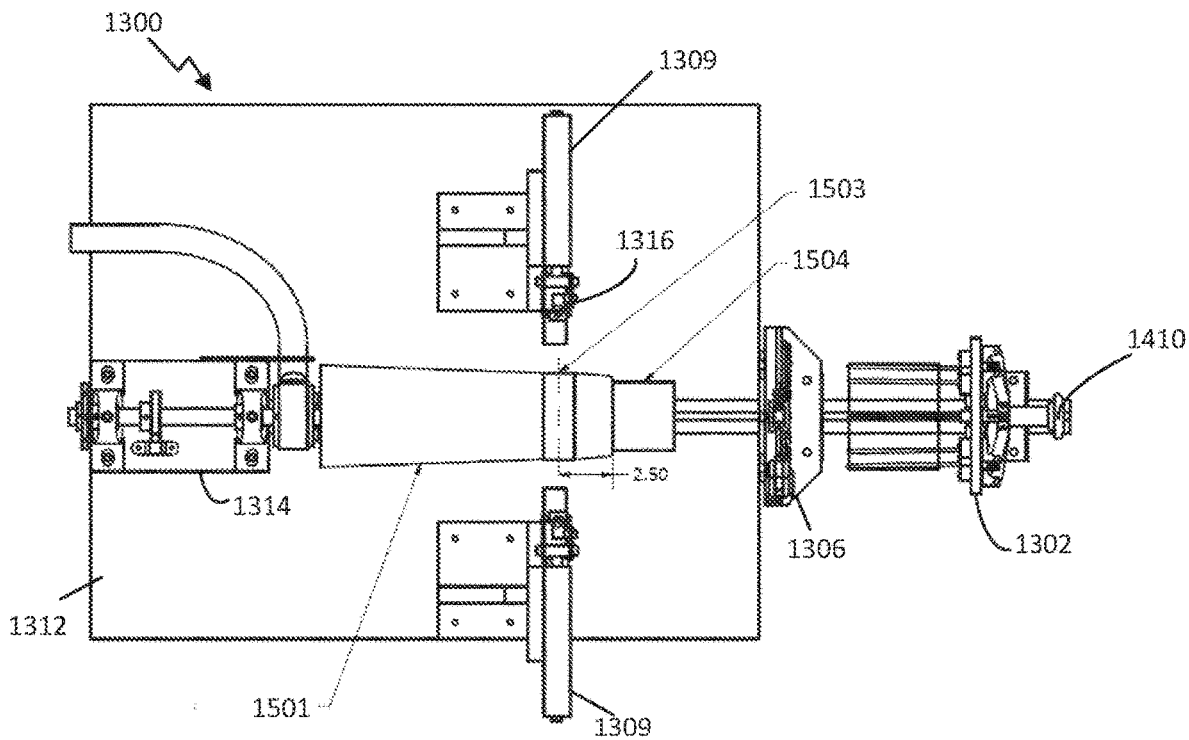

FIGS. 15A and 15B illustrate top views of the manufacturing system 1300 before and after a garment sleeve is placed onto the mandrel assembly 1304, respectively. As shown in FIGS. 15A and 15B, before a sleeve 1501 is placed on the mandrel assembly 1304, the cuff clamp assembly is moved via linear track 1310 away from the mandrel assembly 1304 toward the multi-prong fork assembly 1302 so as not to interfere with the placement of the sleeve 1501 onto the mandrel 1304. After the sleeve 1501 is placed on the mandrel 1304, as shown in FIG. 15B, the cuff clamp assembly 1306 may be moved along linear track 1310 over and past the mandrel assembly 1304 toward the rotary arm assembly 1314 to be in position for clamping the cuff member 1200 onto the outer surface of the sleeve at a position proximal to the bonding zone 1503 of the sleeve 1501. As shown in FIG. 15A, in accordance with some embodiments, the mandrel 1304 includes an anvil portion 1502 that is positioned to correspond to the bonding zone 1503 of the sleeve 1501 when it is disposed on the mandrel 1304. In some embodiments, the bonding zone 1503 is located approximately 2.5 inches from the seam of sleeve 1501 and a knit cuff 1504. In accordance with some embodiments, the anvil portion 1502 is made from a silicone or urethane rubber, or other suitable material, having a medium durometer of 50 A±10%. As discussed in further detail below, the anvil portion 1502 assists with minimizing wrinkles in the sleeve material and creating a liquid impermeable seal during a reheating of the hot melt adhesive.

As further shown in FIGS. 15A and 15B, the reheating assembly 1308/1316 is initially in a retracted state such that the heating elements 1316 are positioned away from the bonding zone 1503 before the sleeve 1501 is placed on the mandrel 1304. When the sleeve 1501 is positioned on the mandrel 1304, the cuff clamp assembly 1306 is moved away from the fork assembly 1302 toward the rotary assembly 1314. After clamping of an edge portion of the cuff member 1200 onto the sleeve 1501, and the fork assembly 1302 is pulled away from the mandrel assembly 1304, the heating elements 1316 of the reheating assembly 1308 are moved toward the mandrel 1304 to apply heat and pressure to the laminated layers of the cuff member 1200, hot melt adhesive and sleeve 1501, as described above.

Figure 16A:
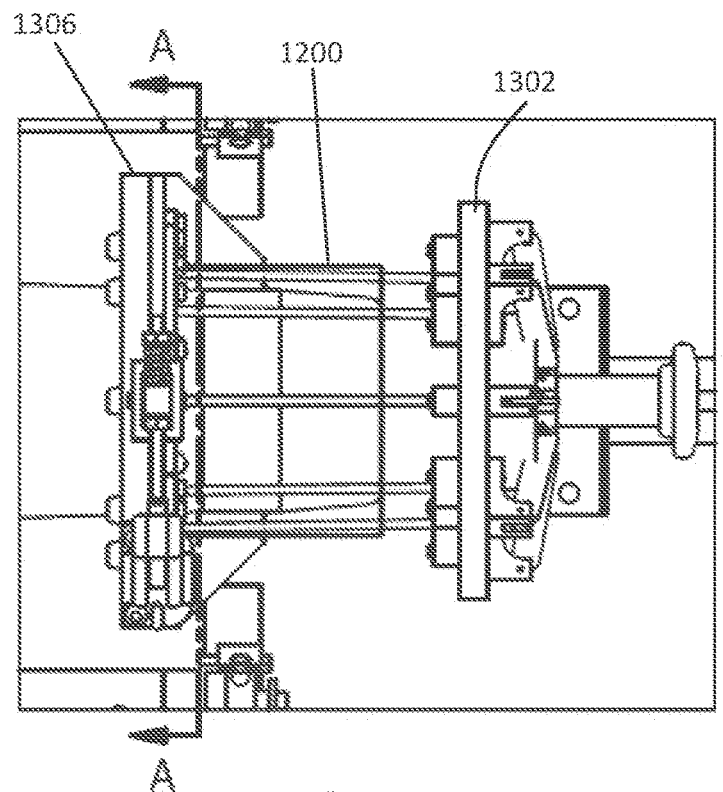
FIGS. 16A and 16B illustrate various views of a cuff clamping assembly of the system shown in FIG. 13, in accordance with some embodiments of the invention.
Figure 16B:
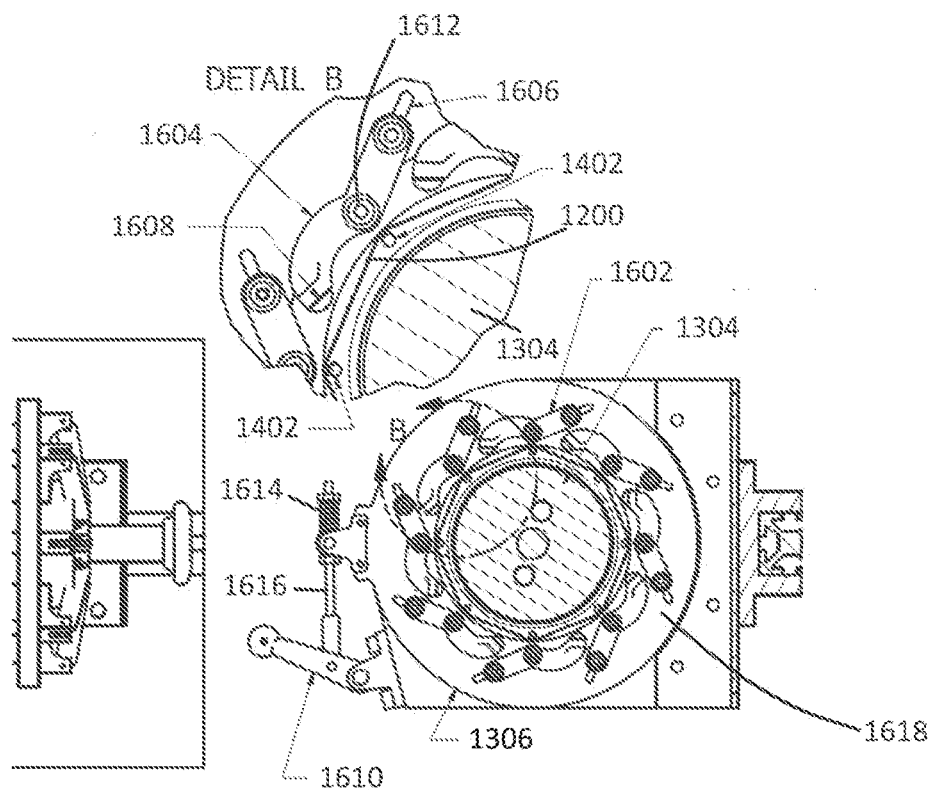

FIGS. 16A and 16B illustrate side and front views of the cuff clamp assembly 1306 of FIG. 13, in accordance with some embodiments. The cuff clamp assembly 1306 includes a plurality (e.g., eight) cuff clamps 1602 disposed at equal intervals to surround the circumference of the mandrel 1304. Each cuff clamp 1602 includes a clamp arm 1604, a cam slot 1606 disposed at a first end of the clamp arm 1604 and a clamping pad 1608 disposed at a second end of the clamp arm 1604, opposite the first end. The clamp assembly 1306 further includes a cam lever 1610 that can be manually or automatically operated in similar fashion to the actuating member 1310 described above. In response to operation of the cam lever 1610, the claim arm 1604 is rotated about a pivot member 1612 to press or release the clamping pad 1608 onto a corresponding portion of the outer surface of the cuff member 1200 disposed around multiple fork prongs 1402 in an expanded (stretched) state. After the cuff member 1200 is positioned over the gown sleeve with the expanded forks, the cuff clamps 1602 close and lock in place the cuff member onto the sleeve 1501 so the multiple fork prongs 1402 can be retracted while the cuff clamps 1602 hold the cuff member 1200 in place relative to the sleeve 1501 and mandrel 1304. In some embodiments, the cam lever 1610 is spring loaded with spring 1614 disposed on a cam lever rod 1616 coupled to a rotary plate 1618 that holds each of the plurality of cuff clamps 1602 in place to hold the cuff member 1200 on the sleeve 1501. In some embodiments, in this state, the linkages of cuff clamps 1602 are in-line and in a stable position with opposing forces canceling each other. This type of mechanism is known as a toggle mechanism. Thus, the cuff clamps 1602 can clamp and hold the cuff member onto the sleeve at multiple points along the leading edge of the cuff. This holds the cuff in position as the multiple fork prongs are withdrawn, as described above. In some embodiments, each of the multiple cuff clamps 1602 contacts the cuff member between respective two adjacent fork prongs 1402, stretches the elastic cuff member film onto the sleeve surface, applying pressure against the sleeve. Thereafter, the forks prongs 1402 can be withdrawn, causing unclamped portions of the elastic cuff member to snap to a tight fit around the sleeve and mandrel.

As shown in FIG. 16B, in accordance with some embodiments, the number of cuff clamps 1602 is equal to the number of fork prongs 1402 of the multi-prong fork assembly 1302, and each cuff clamp 1602 is positioned so that each respective clamping pad 1608 when engaged to hold the cuff member 1200 in place is positioned approximately equidistant between two adjacent fork prongs 1402. In this way, when the clamping pads 1608 are engaged to hold down the cuff member 1200 in place with respect to the sleeve 1501 and mandrel 1304, the multiple fork prongs 1402 can be retracted and moved away from the mandrel assembly 1304 more easily, without disrupting the position of the cuff member 1200.

Figure 17A:
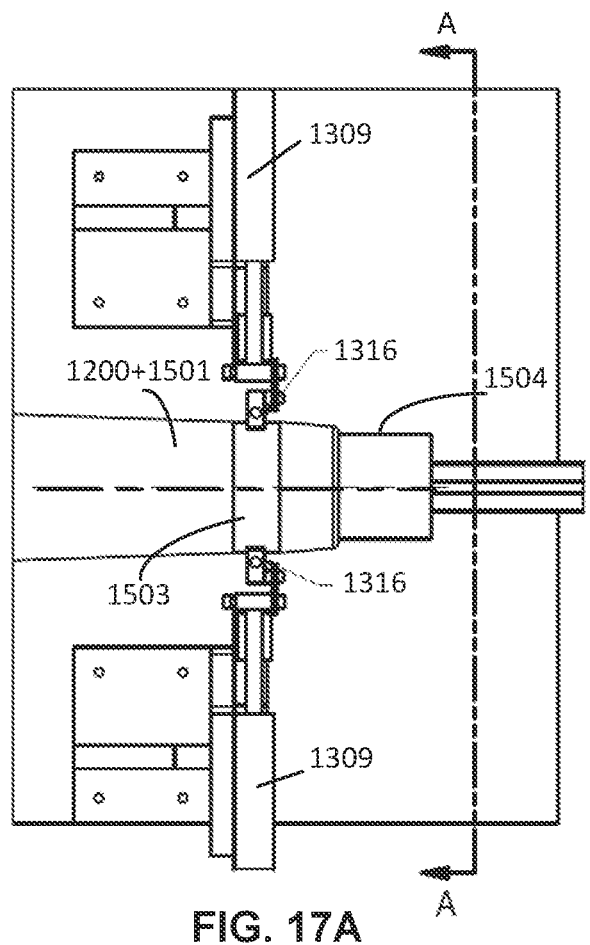
FIGS. 17A and 17B illustrate top and front views of the reheating assembly and mandrel assembly with a sleeve disposed thereon, in accordance with some embodiments of the invention.
Figure 17B:
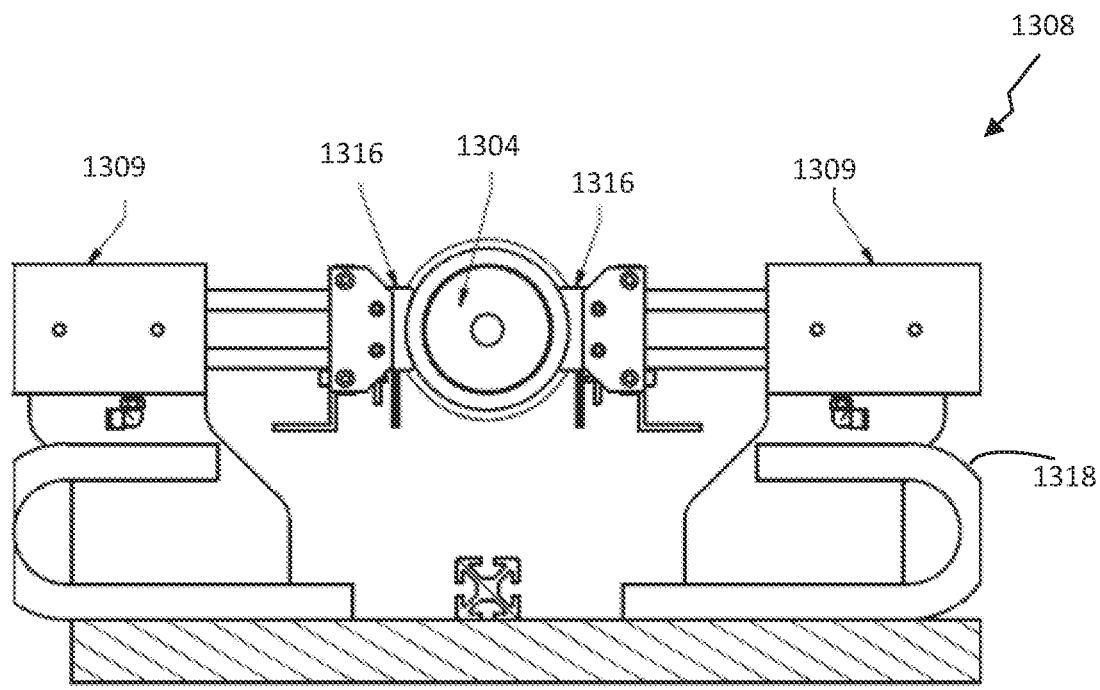

FIGS. 17A and 17B illustrate top and front views of the reheat assembly 1308 when the heating elements 1316 are engaged to apply heat and pressure to the layers of the cuff member 1200, hot melt adhesive and the sleeve material 1501, in accordance with some embodiments. After the cuff member 1200 is positioned such that a bonding zone of the cuff member 1200 is aligned with the bonding zone 1503 of the sleeve, and the multiple fork prongs 1402 are retracted, as described above, two heating elements 1316 are moved toward the mandrel 1304 on opposite sides of the mandrel 1304 to apply heat and pressure onto layers of the cuff member 1201, hot melt adhesive, and the sleeve 1501 at the bonding zone 1503 corresponding to the position of the anvil 1502. As described above, the linear actuators 1309 move their respective heating elements 1316 between their engaged and disengaged positions. In accordance with various embodiments, the linear actuators may be operated either manually or automatically as part of an automated manufacturing system, similarly as described above with respect to the actuating member 1410. After reheating is performed at first portions of the bonding zone, the heating elements 1316 are retracted and the mandrel rotated a next predetermined position (e.g., a predetermined number of degrees) to reheat another portion of bonding zone, until the entire circumference of the bonding zone is reheated and sealed to provide a complete liquid impermeable seal around the full 360 circumference of the bonding zone between the cuff member 1200 and the sleeve material 1502. As discussed above, reheating the hot melt adhesive allows the adhesive to flow into the pores and spaces between the fibers of the sleeve material, thereby creating an improved liquid impervious seal between the cuff member 1200 and the sleeve 501 at the bonding zone 1503.

As described above novel methods and systems of making a protective garment having a cuff member attached to each of its sleeves are disclosed. It is understood that the above described methods and systems are intended to convey certain features and advantages described in the present disclosure, and not intended to limit the scope of the present disclosure. Various modifications to the methods and systems disclosed herein would be apparent to those of ordinary skill in the art to achieve one or more features and advantages disclosed herein. For example, it has been found that bonding the cuff material to the sleeve in an un-stretched state by reheating an adhesive between the cuff material and the sleeve provides a significantly improved seam or bond between the cuff material and sleeve material that is liquid impermeable or substantially liquid impermeable. It has further been found that by bonding the cuff material to the sleeve in a stretched state and reheating the adhesive between the cuff material and the sleeve provides a further improved seam/bond between the cuff material and sleeve material that is reliably and consistently liquid impermeable. Both of these embodiments provide significant advantages and improvements over conventional protective gowns, and method and systems for making same.

Figure 18A:
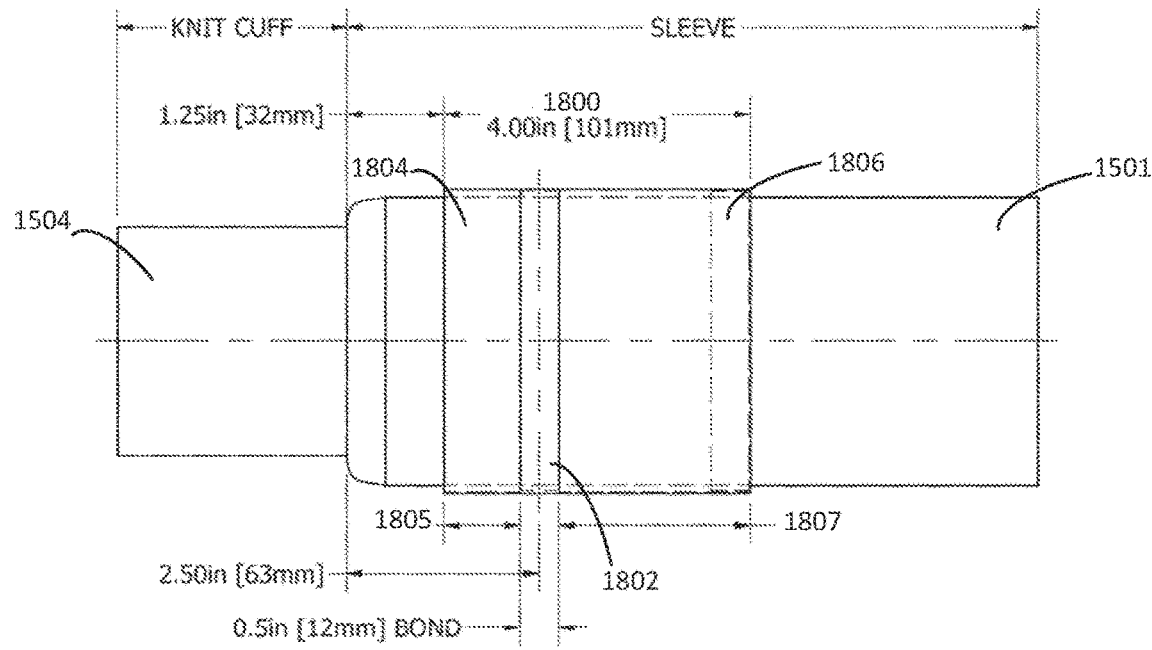
FIGS. 18A-18C illustrates three different embodiments a protective garment sleeve having a cuff member attached and sealed to an outer surface of the sleeve, in accordance with various embodiments of the invention.
Figure 18B:
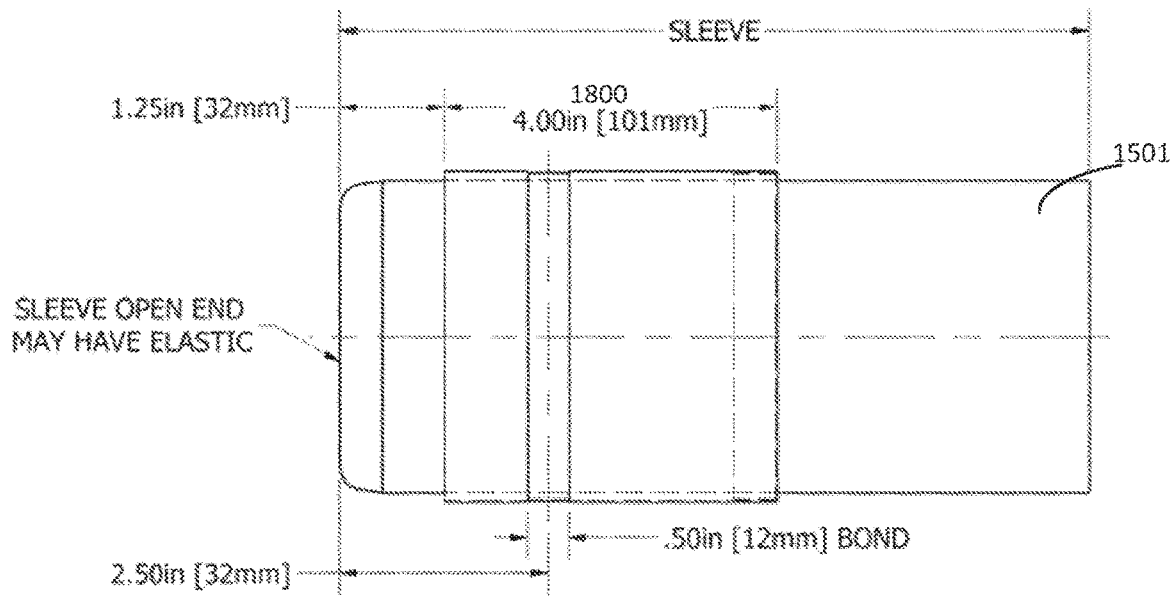
Figure 18C:
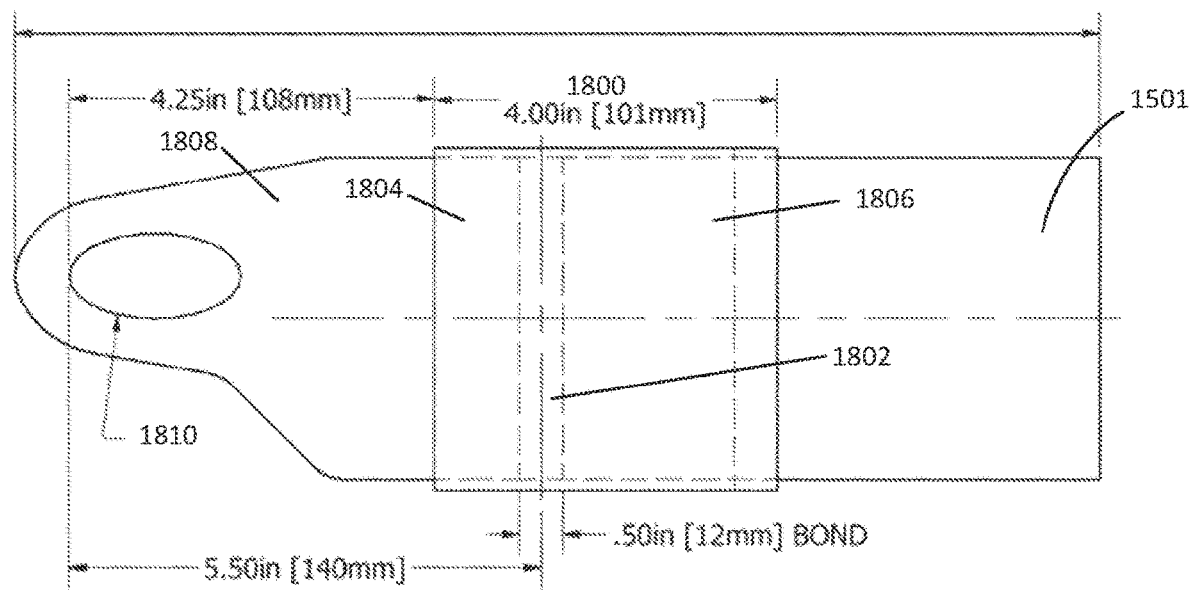

FIGS. 18A-18C show three different embodiments of garment sleeve with a cuff member 1800 (e.g., a TUFF CUFF™) attached and sealed to an outer surface of the sleeve 1501. FIG. 18A illustrates a first design in which the cuff member 1800 has an overall longitudinal length of 4.00 inches. A bonding zone 1802 between the cuff member 1800 and the sleeve 1501 is approximately 0.5 inches in width and positioned between 0.5 to 1.0 inches away from a distal edge of the cuff member 1200, to provide a skirt portion 1804 of cuff member 1800 having a width 1805 that is approximately 0.5 to 1.0 inches (e.g., 0.75 inches). As shown in FIG. 18A, a mid-point of the bonding zone 1802 is approximately 2.5 inches from a distal edge of the sleeve 1501 where a knit cuff is sewn or otherwise attached to the sleeve. In accordance with various embodiments, the distance between the mid-point of the bonding zone 1802 and the distal edge of the sleeve 1501 can be in the range of 2.0 to 3.0 inches. In some embodiments, when a protective glove is worn by a user, an o-ring of the protective glove will be positioned over the skirt portion 1804. On the other side of the bonding zone

1802, opposite the skirt portion 1804, is a foldable cuff portion 1806 having a width of 1807 that is approximately 2.5 to 3.0 inches.

As described above with respect to FIGS. 9B to 10B, when a user wears a protective glove over the knit cuff 1504 and the o-ring of the protective glove is position over the skirt portion 1804, the foldable portion 1806 can be folded over the o-ring of the protective glove to sandwich the o-ring between the skirt portion 1804 and the foldable portion 1806. In some embodiments, the surfaces of skirt portion 1804 and the foldable portion 1806 that contact the o-ring and protective glove can be textured and/or have a material composition to provide a resistance to lateral slippage between the o-ring of the protective glove and the surfaces of the skirt portion 1804 and the foldable portion 1806 that sandwich the o-ring. In accordance with some embodiments, the cuff member 1800 can be made from a liquid impermeable material. Thus, the cuff member 1800 can provide a liquid impermeable barrier to prevent liquids (e.g., perspiration) that may accumulate under the protective glove from escaping from the protective glove and entering and contaminating an external environment (e.g., a surgery area). Additionally, since the seam created at bonding zone 1802 between the cuff member 1800 and the gown sleeve 1501 is liquid impermeable, as described above, no liquids can pass through the seam at the bonding zone in either direction, protecting both the wearer of the protective gown and the external environment from cross-contamination.

FIG. 18B illustrates another embodiment in which the cuff member 1800 is attached and sealed to an outer surface of the sleeve 1501. The embodiment of FIG. 18B is similar to that of FIG. 18A, except that the sleeve 1501 does not have a knit cuff 1503. Instead a distal end of the sleeve 1501 can incorporate an elastic band to improve fit and tear-resistance. The other features and dimensions shown in FIG. 18B are substantially the same as that shown in FIG. 18A and, therefore, their description is not repeated here.

FIG. 18C illustrates a further embodiment in which the cuff member 1800 is attached and sealed to an outer surface of the sleeve 1501. The embodiment of FIG. 18C is similar to that of FIG. 18A, except that the knit cuff 1503 is replaced with a palm draping portion 1808 having a thumb hole 1810 configured to receive a thumb of a wearer therethrough. In this way, the thumb hole 1810 can maintain the position of the sleeve 1501 in a relatively constant position relative to the wearer's hands and wrists. As shown in FIG. 18C, a mid-point of the bonding zone 1802 is approximately 5.5 inches from a distal edge of the thumb hole. In accordance with various embodiments, this distance can be in the range of 4.5 to 6.5 inches. The other features and dimensions shown in FIG. 18C are substantially the same as that shown in FIG. 18A and, therefore, their description is not repeated here.

In some embodiments, cuff member material is a three-layer laminate of an elastomeric material sandwiched between two polypropylene film layers having the desirable properties of elasticity and liquid impermeability described herein. Using such a three-layer laminate film material, a cuff member can be constructed by performing the steps 1101-1106, as described above with respect to FIG. 11. One example of a suitable three-layer laminate film is available from Berry Global Inc. under the name Elastipro® 4008, which is a laminate film that is cast-extruded from a blend of styrenic and elastomeric resins with a thin polyolefin skin. It has weight range of 30-35 grams per square meter and a machine direction (MD) Elongation of 730% and a cross direction (CD) elongation of 800%, a MD tensile at break of 32.4 N/inch and a CD tensile at break of 23.5 N/inch. It has a CD Load @ 100% of 1.7 N, a CD load @ 50% 0.9 N (2nd upload), a CD Load @100% 1.5 N 2nd Upload), and a CD load @ 50% 0.4 N (2nd upload) with a CD Permanent Set @ 100% 5.5%. It has been found that a cuff material made from such a three-layer laminate can avoid degradation of the cuff member during reheating of the hot-melt adhesive, as described above, or during seaming of the gown sleeve after the cuff member is attached to a flat gown sleeve, as described above.

In some embodiments, the unsealed end of the foldable portion 1806 can be rolled over and sealed to provide the user with a grip to pull the foldable portion 1806 over the o-ring of the protective glove (Inventive Sample 1). In alternative embodiments, a bead of Vistamax™ 6902, a elastomeric hot melt primarily composed of isotactic propylene repeat units with random ethylene distribution, is used to create an elastic o-ring at the unsealed end of the foldable portion 1806 (Inventive Sample 2). In yet another embodiment, a pre-made o-ring is adhesively bonded to the unsealed end of the foldable portion 1806 (Inventive Sample 3). It is been found that each of the above described sample embodiments, can pass the ASTM 1670 Seam Test and the Vartest Laboratories Dunk Test, which test the strength and liquid impermeability of seams formed in cloth or textile materials. A video of tests performed on Mar. 13, 2024 can be found at https://vimeo.com/923487610/db16b080af?share=copy. As shown in this video, a protective garment sleeve having a cuff member sealed to an outer surface of the sleeve (Tuff Cuff™ sleeve) was tested alongside a conventional sleeve with knit cuff (conventional sleeve). As described above with reference to FIG. 18A, a first protective glove was placed over the users hand and over a knit cuff such that an o-ring of the protective glove was placed over a skirt portion 1804 of the cuff member 1800. The foldable portion 1806 of cuff member 1800 was then folded over the skirt portion 1804 and o-ring of the first protective glove. A second protective glove was then placed over the first protective glove and the cuff member 1800. For the conventional sleeve, a first protective glove was worn to cover the knit cuff and a distal of the convention sleeve. A second protective glove was then worn over the first protective glove such that the second protective glove completely covered the first protective glove.

In a first test, the conventional sleeve with two protective gloves was immersed in a red dye solution for five (5) seconds, and the Tuff Cuff™ sleeve with two protective gloves was immersed in the same red dye solution for twenty (20) seconds. Upon removal of the two gloves from the conventional sleeve, it was found that both the knit cuff and hand of the wearer were saturated with red dye solution. In contrast, upon removal of the two gloves from the Tuff Cuff™ sleeve, it was found that both the knit cuff and hand of the wearer were completely dry. In a second test, three (3) cubic centimeters (cc) of the red dye solution were injected through tubes running through the Tuff Cuff™ sleeve into the palm of the hand under the first protective glove worn by the user to emulate an extraordinary amount of perspiration pooling inside the first protective glove. After the first inner protective glove was filled with the red dye solution, the second outer protective glove was removed and it was found that that outer surface of the first protective glove was completely dry. Thus, the Tuff Cuff™ prevented any leakage of liquid from inside the first protective glove to an external environment. These tests demonstrate that the cuff member 1200 of the present disclosure provides a liquid impermeable barrier that prevents liquids (e.g., perspiration) that may build up under a protective glove from escaping past the cuff member 1200, while also preventing any liquids from an external environment from contacting the skin of the wearer under the protective glove. No prior art garments, methods or systems provide such a liquid impermeable barrier between the glove/sleeve interface. As described above, in some embodiments, the material of the cuff member 1200 is made from or includes at least one layer of material that is liquid impermeable. As also described above, in some embodiments, the seal between cuff member 1200 and the outer surface of the sleeve at the bonding zone 1802 is also liquid impermeable. As used herein, the term "liquid impermeable" refers to a material or area that does not allow any liquid to pass therethrough.

In alternative embodiments, the cuff member may be made from an elastic material that can be pre-molded into the desired dimensions of the cuff member, as described above, utilizing dip molding processes used to make disposable surgical gloves, for example. In some embodiments, an unsealed side of such a pre-made cuff member can be rolled to create a ring that provides the user with a grip to pull the cuff over the first glove.

Figure 19A:
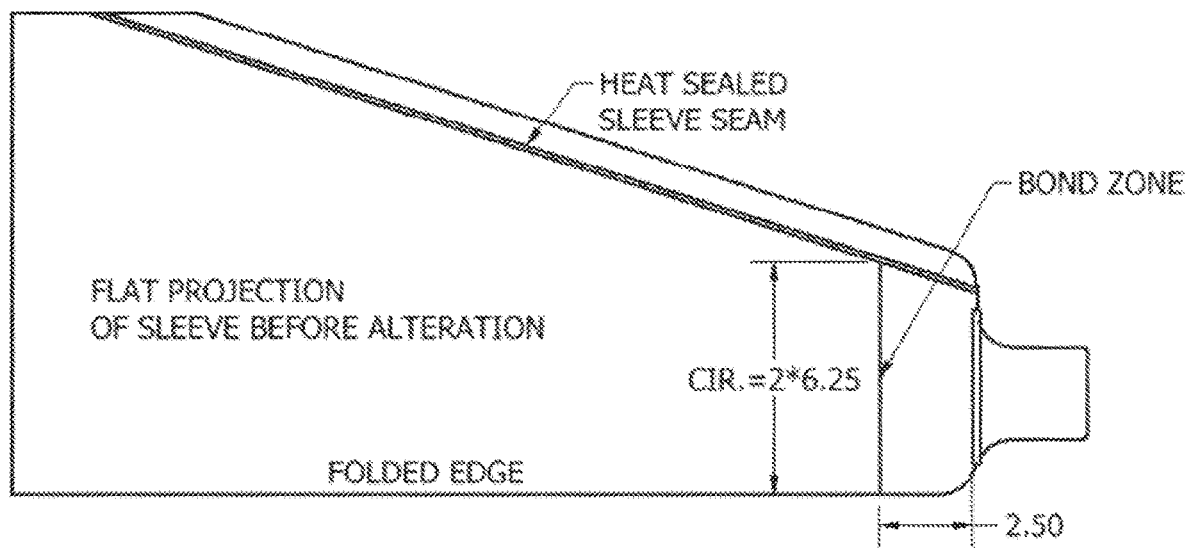
FIG. 19A illustrates a perspective view of a protective garment sleeve having a new heat-sealed sleeve seam to remove excess sleeve material, in accordance with some embodiments of the invention.

Current methods of manufacturing protective gowns typically use a manual process to make a seam in the sleeves of the protective gowns. Such manual placement of sleeve seams causes high variation from 0.1-0.8 inches in diameter at the location of conventional sleeves where the cuff member is desired to be placed. This variation and excess material can causes wrinkles and potential failure points when attempting to make a liquid impermeable seam between the cuff member and the gown sleeve. FIG. 19A illustrates an example of a conventional sleeve that may be altered to reduce excess sleeve material and thereby reduce wrinkles in the material when performing the process steps 1108 to 1111 described above with respect to FIG. 11. Thus, when using current gown sleeves made with the current gown sleeve seaming processes, a novel apparatus and process has been designed to ensure consistent and compatible sleeve diameters that allow the cuff member to be attached and sealed to the sleeve with a liquid impermeable bonding zone between the cuff member and the sleeve, as described above. As shown in FIG. 19A, the diameter of a flat conventional sleeve can be altered by heat sealing the sleeve at a desire location linearly to reduce the overall diameter of the sleeve and provide a desired sleeve shape.

Figure 19B:
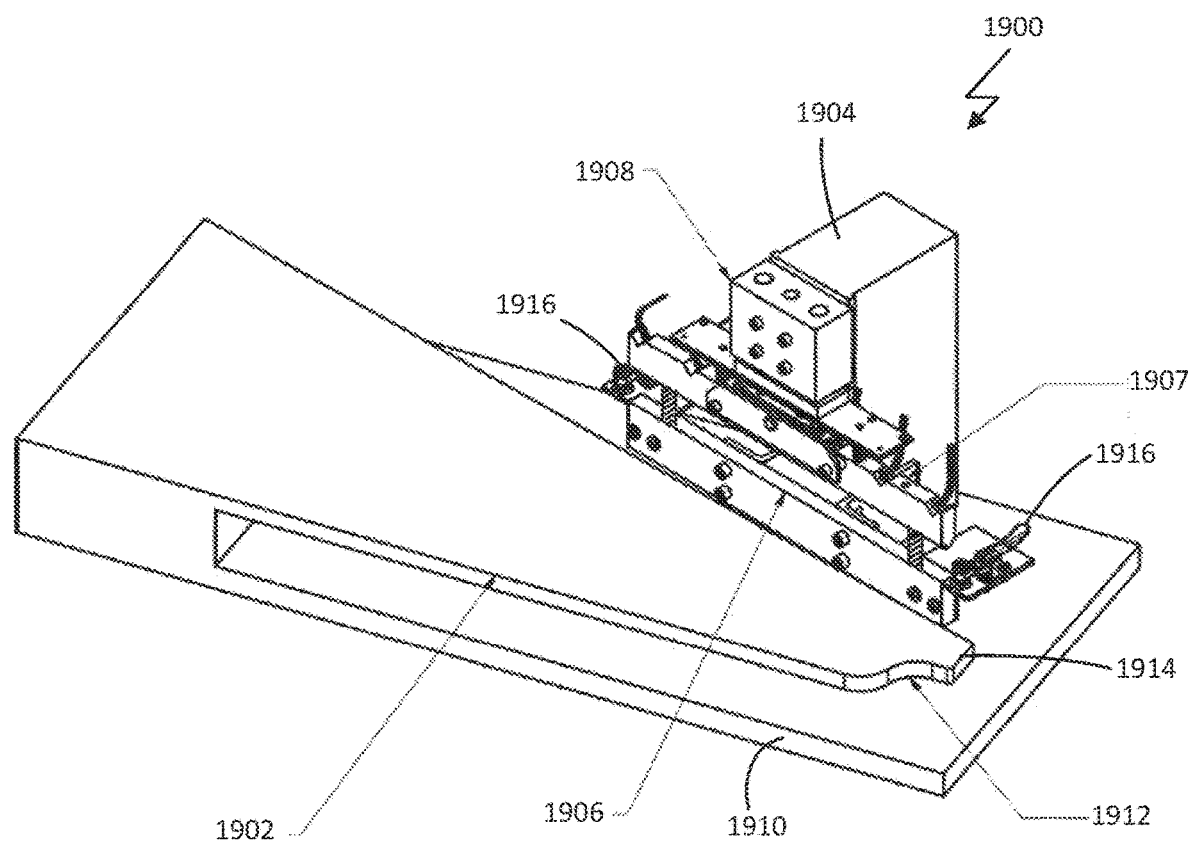
FIG. 19B illustrates a perspective view of an apparatus for decreasing at least a portion of a diameter of a gown sleeve, in accordance with some embodiments of the invention.

FIG. 19B illustrates a perspective view of sleeve re-seaming assembly 1900 configured to modify a diameter (or circumference) of at least a portion of a conventional sleeve so that wrinkles in the sleeve material can be eliminated or significantly reduced when bonding the sleeve material to a cuff member, as described above. In accordance with some embodiments, the re-seaming assembly 1900 configured to perform the sleeve resizing includes at least two parts: (1) a mandrel 1902 for holding a sleeve thereon during re-seaming; and (2) a heating assembly 1904 having at least one heat seal anvil 1906, a heat seal bar 1907 and at least one linear actuator 1908. The heat seal anvil 1906 is attached to the heat seal bar 1907, which is attached to the linear actuator 1908. The linear actuator 1908 can be controlled manually or automatically to move the heat seal bar 1907 and anvil 1906 to apply pressure and transfer thermal energy at the desired new seam location of a sleeve (not shown).

As shown in FIG. 19B, in some embodiments, the mandrel 1902 has a flat tapered shape configured to receive a sleeve thereon such that the sleeve will be substantially flat during the re-seaming process, in a similar way a sleeve is slat when ironing the sleeve on an ironing board. The mandrel 1902 is attached to a larger platform 1910 that holds and stabilizes the mandrel 1902 during re-seaming. The mandrel 1902 further includes a notch portion 1912 formed between a tapered end portion 1914 and a main body portion of the mandrel 1902. The notch portion 1912 is configured to provide a seat for a knit cuff or end portion of a sleeve to rest when the sleeve is placed on the mandrel 1902 while the tapered end portion 1914 can extend into or past the knit cuff or past a distal edge of the sleeve. In some embodiments, it is desired that the mandrel diameter matches the sleeve diameter at the bond zone, as described above. If the sleeve diameter is too small, the sleeve seam may rip or tear when placed on the mandrel. If the sleeve diameter is too large the extra material will fold and wrinkle creating a leak across the bond zone. Preferably, the target sleeve and mandrel diameter mismatch is less than 0.06 inch (1.5 mm).

As further shown in FIG. 19B, the re-seaming assembly 1900 further includes two clamps 1916 located adjacent to opposite ends of the heat seal anvil 1906, and fixedly attached to the platform 1910. The clamps 1912 hold down portions of the sleeve material onto the platform 1910 as the heat seal anvil 1906 is moved downwardly between the two clamps 1916 to re-seam at least a portion of the sleeve, thereby reducing a diameter (or circumference) of the sleeve at the bond zone of the sleeve. As mentioned above, if the sleeve diameter at the bond zone is greater than a diameter near a bond zone of the cuff member, such sleeve may be salvaged by reducing the size of the sleeve. In some embodiments, the excess material of the sleeve can be removed by adding a new heat seal along the original sleeve seam at an internal surface of the sleeve (i.e., the sleeve is turned inside-out) at a location along and adjacent to the original sleeve seam to achieve the desired diameters and size of the sleeve. FIG. 19A illustrates changing the flattened sleeve circumference at the bond zone from 13.50 inches (342 mm) to 12.50 inches (317 mm), in accordance with one exemplary embodiment.

Figure 20A:
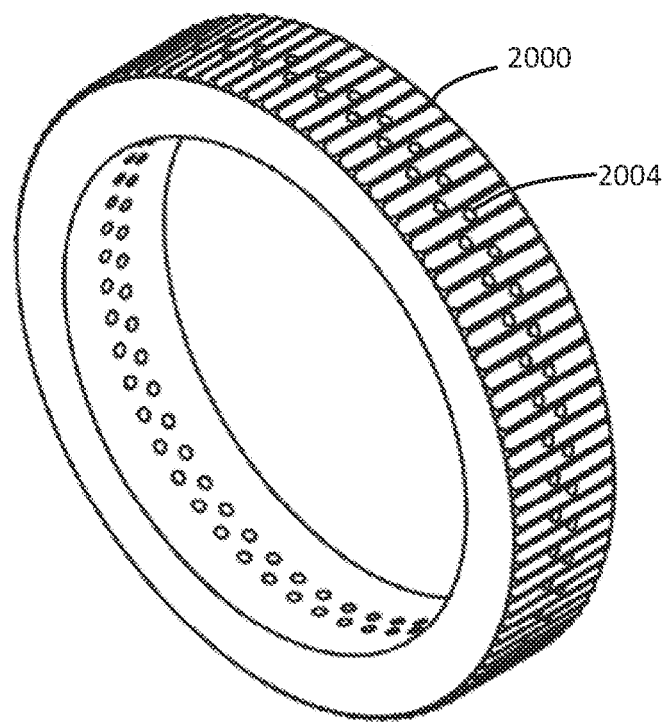
FIGS. 20A and 20B illustrates two views of a microfold anvil that may be utilized in the mandrel assembly of the system shown in FIG. 13, in accordance with some embodiments of the invention.
Figure 20B:
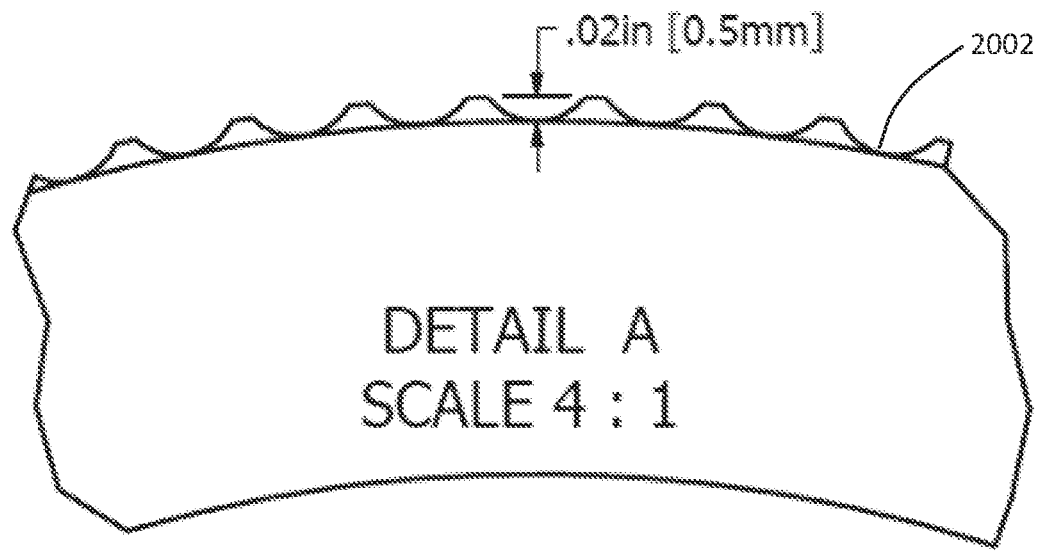

In alternative embodiments, loose fitting sleeves with excess material can be processed with tooling improvements. Typically, the anvil surface at the bond zone is flat and smooth, and the shape is cylindrical or conic. If excess sleeve material is present on a flat anvil, wrinkles or folds can occur, which can create channels for leakage. One solution is to replace a smooth anvil with an anvil 2000 containing a scallop shaped microfold surface topography, as shown in FIGS. 20A and 20B. The anvil 2000 includes a plurality of shallow depressions, otherwise referred to herein as "microfolds," along the exterior perimeter surface of the anvil 2000. The perimeter of the microfold anvil 2000 is larger than a flat anvil and, therefore, can accommodate excess material of the sleeve more readily without allowing the excess material to cause conventional wrinkles or folds. In some embodiments, a plurality (e.g., 100) of small depressions or microfolds 2002 placed around the circumference of the anvil 2000 will increase the circumference and perimeter area of the anvil 2000 5% to 10%. In some embodiments, the microfold anvil 2000 further includes a plurality of vacuum holes 2004 that are configured to be coupled to a vacuum source and supply a vacuum suction to hold the material of the garment sleeve on the anvil 2000. Thus, the microfold anvil can hold and absorb extra sleeve material without forming conventional wrinkles or folds, but instead forms evenly-spaced and uniform microfolds or undulating depressions in the material. In some embodiments, as shown in FIG. 20B, small shallow depressions 2002, preferably 0.02 inches (0.50 mm) deep, will fill with hot melt during the reheating process creating a leak proof seal. In various embodiments, the depressions or microfolds can be in the range of 0.01 to 0.05 inches deep. A shallow depression or microfold is different from a typical fold or wrinkle, since typical folds and wrinkles prevent hot melt from penetrating and sealing. In contrast, it has been found that microfolds or shallow depressions can easily fill with hot melt to provide a liquid impermeable seal.

The foregoing outlines features of several embodiments so that those of ordinary skill in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A protective garment, comprising:
a sleeve having a first bonding zone;
a cuff member attached and sealed to an outer surface of the sleeve, the cuff member comprising:
a second bonding zone attached and sealed to the first bonding zone of the sleeve;
a foldable cuff portion extending proximally outwardly from the second bonding zone in an unfolded position and configured to fold over and cover the second bonding zone in a folded position;
a liquid impermeable seal between the first and second bonding zones; and
a skirt portion extending distally outwardly from the second bonding zone, wherein the foldable cuff portion covers the second bonding zone and the skirt portion when in the folded position.

2. The protective garment of claim 1, wherein:
a width of the first bonding zone is 0.5 inches;
a width of the skirt portion is 0.5 to 1.0 inches; and
a width of the foldable cuff portion is 2.0 to 3.0 inches.

3. The protective garment of claim 1, wherein a distance between a mid-point of the second bonding zone and a distal edge of the sleeve is in a range of 2.0 to 3.0 inches.

4. The protective garment of claim 1, wherein the cuff member comprises a liquid impermeable material.

5. The protective garment of claim 1, further comprising;
a palm draping portion attached to and extending outwardly from a distal edge portion of the sleeve; and
a thumb hole formed in the palm draping portion and configured to receive a thumb of a wearer therein.

6. The protective garment of claim 5, wherein a mid-point of the second bonding zone is located 4.5 to 6.5 inches from a distal edge of the thumb hole.

7. The protective garment of claim 1, wherein the cuff member comprises a three-layer laminate of an elastomeric material sandwiched between two polymer layers.

8. A protective garment, comprising:
a sleeve having a first bonding zone;
a cuff member attached and sealed to an outer surface of the sleeve, the cuff member comprising:
a second bonding zone attached and sealed to the first bonding zone of the sleeve;
a foldable cuff portion extending proximally outwardly from the second bonding zone in an unfolded position and configured to fold over and cover the second bonding zone in a folded position; and
a liquid impermeable seal between the first and second bonding zones;
wherein the cuff member comprises an elastic material that is stretched 10% to 40% larger in at least one dimension during sealing of the cuff member to the outer surface of the sleeve.

9. A protective garment, comprising:
a sleeve material;
a cuff material attached and sealed to a first portion of an outer surface of the sleeve material, the cuff material comprising: a foldable cuff portion extending proximally outwardly from the first portion in an unfolded position and configured to fold over and cover the first portion in a folded position, and a skirt portion extending distally outwardly from the first portion of the outer surface of the sleeve material, wherein the foldable cuff portion covers the first portion and the skirt portion when in the folded position; and
a liquid impermeable seal between a second portion of the cuff material and the first portion of the outer surface of the sleeve material,
wherein overlapping longitudinal edges of the sleeve material and the cuff material are sealed to form the sleeve material and cuff material into a cylindrical shape.

10. The protective garment of claim 9, wherein:
the sleeve material comprises a first bonding zone corresponding to the first portion;
the cuff material comprises a second bonding zone corresponding to the second portion and attached and sealed to the first bonding zone of the sleeve material;
a width of the first bonding zone is 0.5 inches;
a width of the skirt portion is 0.5 to 1.0 inches; and
a width of the foldable cuff portion is 2.0 to 3.0 inches.

11. The protective garment of claim 10, wherein a distance between a mid-point of the second bonding zone and a distal edge of the sleeve material is in a range of 2.0 to 3.0 inches.

12. The protective garment of claim 9, wherein the cuff material comprises a liquid impermeable material.

13. The protective garment of claim 9, wherein the cuff material comprises an elastic material that is stretched 10% to 40% larger in at least one dimension during sealing of the cuff material to the first portion of the outer surface of the sleeve material.

14. A protective garment, comprising:
a sleeve material;
a cuff material attached and sealed to a bonding portion of an outer surface of the sleeve material, the cuff material comprising a foldable cuff portion extending proximally outwardly from the bonding portion in an unfolded position and configured to fold over and cover the bonding portion in a folded position, wherein the foldable cuff portion comprises an O-ring disposed at an edge portion of the foldable cuff portion; and
a liquid impermeable seal between the cuff material and the bonding portion of the outer surface of the sleeve material.

15. The protective garment of claim 14, wherein the cuff material comprises a skirt portion extending distally outwardly from the bonding portion, and wherein the foldable cuff portion is configured to cover the bonding portion and the skirt portion when in the folded position.

16. The protective garment of claim 14, further comprising:
- a palm draping portion attached to and extending outwardly from a distal edge portion of the sleeve material; and
- a thumb hole formed in the palm draping portion and configured to receive a thumb of a wearer therein.

17. The protective garment of claim 14, further comprising a ridge portion extending upwardly from a surface of the cuff material, wherein the foldable cuff portion is configured to cover the bonding portion and the ridge portion when in the folded position, and wherein the foldable cuff portion comprises a liquid impermeable material.

18. The protective garment of claim 17, wherein the cuff material comprises an elastic material that is stretched 10% to 40% larger in at least one dimension during sealing of the cuff material to the bonding portion of the outer surface of the sleeve material.

\* \* \* \* \*